US012307149B2

(12) United States Patent
Fan et al.

(10) Patent No.: US 12,307,149 B2
(45) Date of Patent: May 20, 2025

(54) METHODS AND SYSTEMS FOR PREVENTING MOTION SICKNESS VIA POSTURAL ANALYSIS

(71) Applicants: Szu Wen Fan, Markham (CA); Yuan Deng, Markham (CA); Juntao Ye, Markham (CA)

(72) Inventors: Szu Wen Fan, Markham (CA); Yuan Deng, Markham (CA); Juntao Ye, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 18/062,553

(22) Filed: Dec. 6, 2022

(65) Prior Publication Data

US 2024/0184497 A1 Jun. 6, 2024

(51) Int. Cl.
*G06F 3/14* (2006.01)
*G06F 3/01* (2006.01)
*G06F 3/0346* (2013.01)

(52) U.S. Cl.
CPC ........... *G06F 3/14* (2013.01); *G06F 3/012* (2013.01); *G06F 3/013* (2013.01); *G06F 3/0346* (2013.01)

(58) Field of Classification Search
None
See application file for complete search history.

(56) References Cited

U.S. PATENT DOCUMENTS

| 11,397,472 | B1 * | 7/2022 | Kim ......................... B60R 11/04 |
| 2013/0072820 | A1 * | 3/2013 | Lee ........................... G16Z 99/00 |
| | | | 600/594 |
| 2014/0022369 | A1 * | 1/2014 | Kwon ....................... G08B 21/02 |
| | | | 348/158 |
| 2018/0052000 | A1 * | 2/2018 | Larner .................. G05D 1/0212 |
| 2018/0089901 | A1 * | 3/2018 | Rober ....................... G06T 13/40 |
| 2018/0190175 | A1 * | 7/2018 | Moeller ..................... G06T 11/60 |
| 2020/0061332 | A1 * | 2/2020 | Dry .......................... G06F 3/011 |
| 2021/0093827 | A1 * | 4/2021 | Schmidt .................. G06F 3/011 |

FOREIGN PATENT DOCUMENTS

DE 102017215641 A1 * 3/2019

OTHER PUBLICATIONS

Kuiper, O. X., Bos, J. E., and Diels, C., Looking forward: In-vehicle auxiliary display positioning affects carsickness, Applied Ergonomics, No. 68, pp. 169-175 2018.
Diels, C., and Bos, J. E., Self-driving carsickness, Applied ergonomics, No. 53, 374-382 2016.
Iskander, J., Attia, M., Saleh, K., Nahavandi, D., Abobakr, A., Mohamed, S., and Hossny, M., From car sickness to autonomous car sickness: A review, Transportation research part F: traffic psychology and behaviour, No. 62, p. 716-726 2019.
Eike A. Schmidt, Ouren X. Kuiper, Stefan Wolter, Cyriel Diels, Jelte E. Bos, An international survey on the incidence and modulating factors of carsickness, Transportion research part F: traffic psychology and behaviour, No. 71, p. 76-87 2020.

* cited by examiner

*Primary Examiner* — Jwalant Amin

(57) ABSTRACT

Methods and systems for preventing motion sickness via postural analysis are provided. In response to a determination that the portable electronic device is in motion, that the portable electronic device is being used for visual activities, and that the user of the portable electronic device has an unhealthy posture, a time to implement an intervention is determined. The intervention is subsequently performed at the determined time.

20 Claims, 14 Drawing Sheets

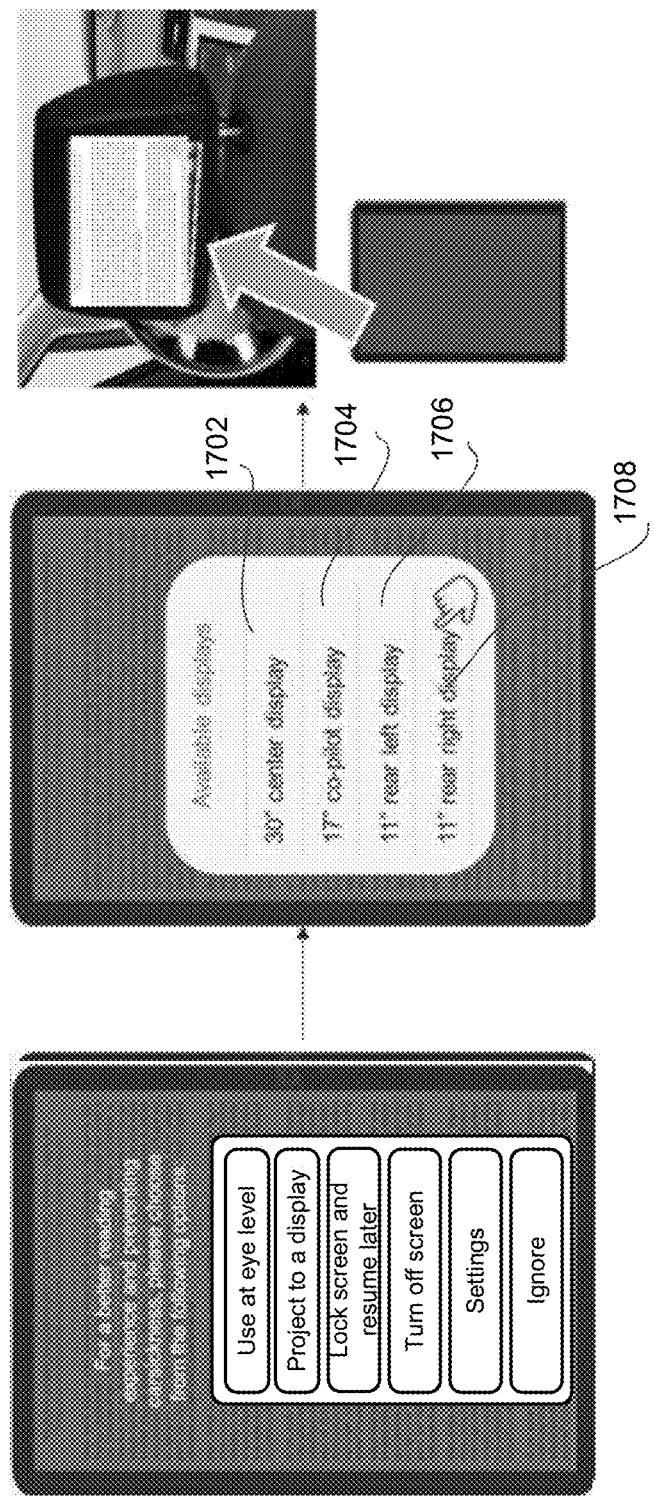

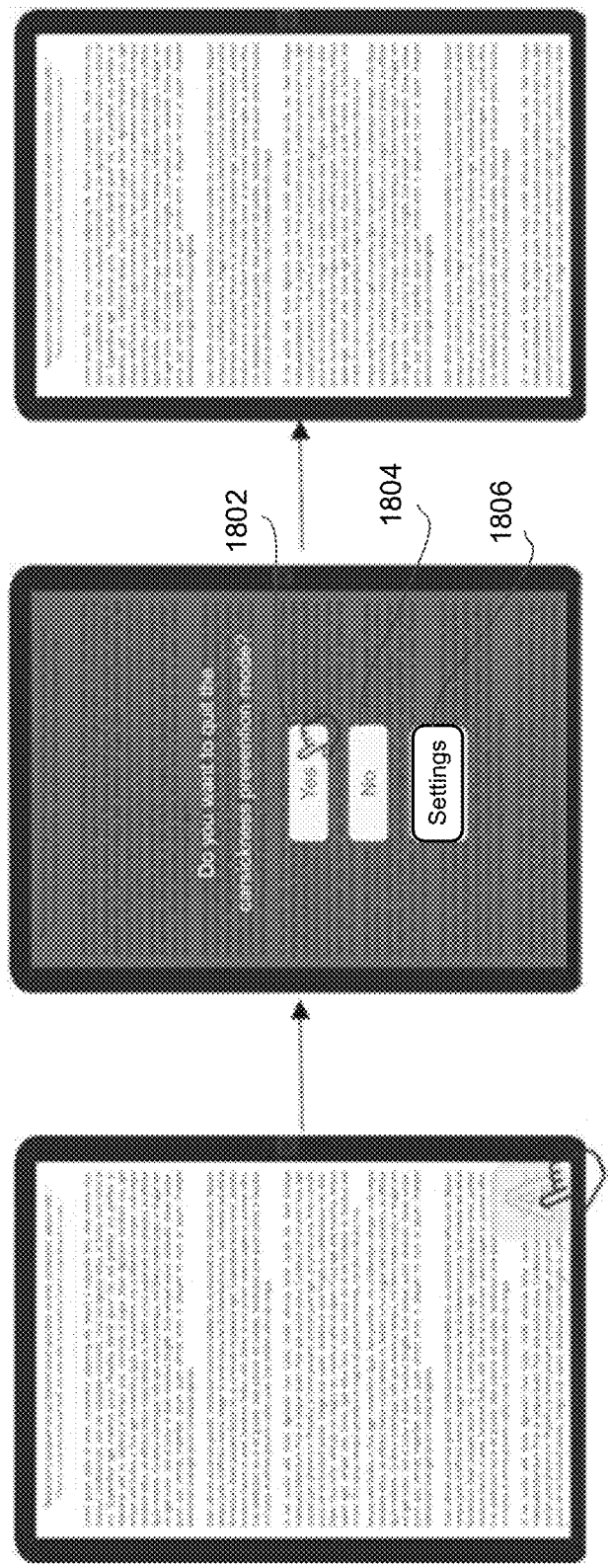

METHODS AND SYSTEMS FOR PREVENTING MOTION SICKNESS VIA POSTURAL ANALYSIS

TECHNICAL FIELD

The present disclosure relates to motion sickness, and in particular, to a methods and systems for preventing motion sickness via postural analysis.

BACKGROUND

During a car ride, it is very common for a passenger to use his/her portable electronic device, such as a smartphone or a tablet, for visual activities such as browsing the Internet, reading articles, writing, watching videos, playing games or the like. With autonomous vehicles, a driver may transfer from an active driver to a passive supervisor or passenger. In such cases, the driver may also engage in non-driving activities involving their portable electronic device. However, the use of a portable electronic device for visual activities have found to be one of the major factors that could cause motion sickness. Accordingly, there is a need for methods and systems for preventing motion sickness.

SUMMARY

The present disclosure describes methods and systems for preventing motion sickness via postural analysis. Research has found that there are two main reasons why visual activities using a portable electronic device can induce motion sickness. The use a portable electronic device for visual activities usually causes a head tilt downwards which can lead to Coriolis effect motion sickness. Also, when a passenger is looking down, his/her peripheral vision can be partially or completely blocked from outside environment. Non-sufficient peripheral visual information can lead to fewer motion cues on the human visual system, causing sensory conflict, i.e. the passenger's eyes (vision system) are looking at still content on a portable electronic device while their body (vestibular system) feels the movement of the car. This causes a sensory conflict between the vestibular system and visual system, which can cause motion sickness.

Although there are medicines to prevent motion sickness available in the market, taking such medicines is not a solution for majority of people. People who are not susceptible to motion sickness usually would not have medicine ready when taking a car ride. In addition, the side effects of medicines to prevent motion sickness are not desirable. The use of medicines to prevent motion sickness also presents a cost and convenience challenges. For at least these reasons, non-pharmacological methods for motion sickness prevention are needed when using a portable electronic device for visual activities so that people can have a better experience are desirable.

Some existing solutions for motion sickness prevention when reading on a portable electronic device focus on "providing peripheral motion cues" on the display of the portable electronic device that a passenger is using, such as showing a video stream of an outside environment as a reading background or in a side window next to text, showing motion signals or novel objects that indicate car motions, etc. However, these methods do not necessarily have positive effects on mitigating motion sickness. Although some showed positive mitigation effect, others showed no effect or even negative effects. More importantly, passengers still have to look down to read. Therefore, the head position issue cannot be solved using these solutions.

Since looking downwards causes the motion sickness, looking forward and reading at eye level provides a solution which may solve both peripheral and head position problems. A study has found that, compared to a display at glove compartment height, using a display at windscreen height, which is similar to eye height, resulted in less motion sickness (Kuiper, O. X., Bos, J. E., and Diels, C., Looking forward: In-vehicle auxiliary display positioning affects carsickness, Applied Ergonomics, No. 68, pages 169-175, 2018). To keep a passenger reading at his/her eye level, it has been suggested to use book (or device) stands, or to locate displays near the line of sight out of a vehicle window so that the passenger can read at eye level (Diels, C., and Bos, J. E., *Self-driving carsickness*, Applied ergonomics, No. 53, 374-382, 2016; Iskander, J., Attia, M., Saleh, K., Nahavandi, D., Abobakr, A., Mohamed, S., and Hossny, M., From car sickness to autonomous car sickness: A review, Transportation research part F: traffic psychology and behaviour, No. 62, pg. 716-726, 2019).

The use of a book (or device) stand or in-vehicle displays at the windscreen level as a solution for motion sickness prevention when reading on a portable electronic device has several limitations. First, a display at windscreen height may not be available in every vehicle, such as many conventional cars, buses, etc., and would be costly to install whether by the vehicle manufacturer or the end user after purchase. Second, even if there is a stand or display at windscreen height available, most users would not know to use the stand or in-vehicle display to prevent on sickness prevention. Third, because the content is on the portable electronic device and these devices are easier to interact with, people may still prefer to use their portable electronic devices rather than using the stand or in-vehicle displays.

For at least the foregoing reasons, there remains a need for methods and systems for preventing motion sickness.

The present disclosure describes methods and systems for preventing motion sickness via postural analysis. The postural analysis detects when a passenger is looking down. A number of different factors may be considered to determine when the portable electronic device is being used for visual activities such as one or a combination of a state of the display of the portable electronic device, the content being displayed on the display of the portable electronic device, the current activity and active application of the portable electronic device may be used to determine. An appropriate timing for an intervention is determined, which may be after detecting the passenger is looking down and the portable electronic device is being used for visual activities for a certain period, and/or certain vehicle motions or other factors that could cause motion sickness to reach a certain threshold. An appropriate intervention to change the passenger's posture from an unhealthy posture to a healthy posture is performed at the determined appropriate time. The appropriate intervention may be selected by the user, predetermined or dynamically determined. The intervention may prevent the user from continue to use their portable electronic device for visual activities in an unhealthy posture or merely encourage them not to do so, depending on the embodiment. Two possible interventions include using a posture-based intervention on the portable electronic device and a multi-display-based interaction via communication between the portable electronic device and in-vehicle displays. Both interventions aim to help a passenger use their portable electronic device for visual activities at eye level to prevent or avoid motion sickness. The method and system may be configured to be performed only when the passenger is in a moving vehicle, which may be determined using one or a combination of sensor data from a motion sensor and location data from a GPS unit.

In accordance with a first aspect of the present disclosure, there is provided a computer-implemented method of preventing motion sickness while using a portable electronic device, comprising: determining whether criteria for performing an intervention have been met, wherein the criteria for performing the intervention comprise a determination that the portable electronic device is in motion, that the portable electronic device is being used for visual activities, and that the user of the portable electronic device has an unhealthy posture; and in response to a determination that the criteria for performing an intervention have been met: determining a time to implement an intervention; and performing the intervention at the determined time.

In some or all examples, the method further comprises: determining, by one or more of the sensors, whether the portable electronic device is in motion; determining whether the portable electronic device is being used for a visual activity; and determining, by one or more of the sensors, a posture of a user of the portable electronic device.

In some or all examples, wherein the determination that user of the portable electronic device has an unhealthy posture is based on a tilt angle of the portable electronic device, a tilt angle of a head of the user of the portable electronic device or an eye gaze direction of the user of the portable electronic device.

In some or all examples, the unhealthy posture is a looking-downwards posture.

In some or all examples, the method further comprises determining whether the user of the portable electronic device has an unhealthy posture by: determining, by one or more sensors, a tilt angle of the portable electronic device, a tilt angle of a head of the user or an eye gaze direction of the user of the portable electronic device; determining whether the tilt angle of the portable electronic device, the tilt angle of the head of the user or the eye gaze direction of the user of the portable electronic device is within a predetermined range representing a looking-downwards posture; determining that the user of the portable electronic device has an unhealthy posture in response to a determination that the tilt angle of the portable electronic device, the tilt angle of the head of the user or the eye gaze direction of the user of the portable electronic device is within the predetermined range; and determining that the user of the portable electronic device has a healthy posture in response to a determination that the tilt angle of the portable electronic device, the tilt angle of the head of the user or the eye gaze direction of the user of the portable electronic device is not within the predetermined range.

In some or all examples, the tilt angle of the portable electronic device, the tilt angle of the head of the user or the eye gaze direction of the user of the portable electronic device is relative to a horizontal reference, and wherein the predetermined range is 0 degrees to 75 degrees.

In some or all examples, the tilt angle of the portable electronic device, the tilt angle of the head of the user or the eye gaze direction of the user of the portable electronic device is relative to a vertical reference, and wherein the predetermined range is 15 degrees to 90 degrees.

In some or all examples, the determining the time to implement an intervention comprises: determining whether any of one or more decision metrics is greater than or equal to a respective threshold, wherein the respective threshold of each decision metric indicates a high risk of motion sickness if the user were to continue to use the portable electronic device for visual activities; wherein it is determined to be a time to conduct the intervention in response to a determination that any of the one or more decision metrics is greater than or equal to the respective threshold.

In some or all examples, the decision metrics are based on one or more of the following parameters: (1) past and/or present visual activity characteristics; (2) past and/or planned vehicle motions; (3) past and/or planned route information; or (4) risk factors associated with the user and/or visual activity content.

In some or all examples, the decision metrics comprise an accumulated visual activity duration.

In some or all examples, the decision metrics comprise a vehicle motion data threshold.

In some or all examples, the motion data threshold comprises a lateral acceleration amplitude threshold.

In some or all examples, the motion data threshold comprises a number of sharp turns.

In some or all examples, the decision metrics comprise an accumulated visual activity duration and a motion data threshold.

In some or all examples, the method further comprises: determining a time to terminate the intervention; and terminating the intervention at the determined time.

In some or all examples, the determining the time to terminate the intervention comprising: determining whether all of the one or more decision metrics are less than the respective threshold, wherein it is determined to be a time to terminate the intervention in response to a determination that all of the one or more decision metrics are less than the respective threshold.

In some or all examples, the intervention comprises: displaying a prompt on a display of the portable electronic device, the prompt including an instruction to move the portable electronic device to eye level; monitoring a tilt angle of the portable electronic device, a tilt angle of the head of the user or an eye gaze direction of the user of the portable electronic device; and removing the prompt in response to a determination that in response to a determination that the tilt angle of the portable electronic device, the tilt angle of the head of the user or the eye gaze direction of the user of the portable electronic device is not within a predetermined range representing a looking-downwards posture.

In some or all examples, the tilt angle of the portable electronic device, the tilt angle of the head of the user or the eye gaze direction of the user of the portable electronic device is relative to a horizontal reference, and wherein the predetermined range is 0 degrees to 75 degrees, or wherein the tilt angle of the portable electronic device, the tilt angle of the head of the user or the eye gaze direction of the user of the portable electronic device is relative to a vertical reference, and wherein the predetermined range is 15 degrees to 90 degrees.

In some or all examples, the method further comprises: displaying a prompt to select an intervention option on a display of the portable electronic device, the prompt including a plurality of selectable onscreen button, one selectable onscreen button for each of available intervention option; wherein the intervention is performed in response to selection of a button in the plurality selectable onscreen buttons, wherein the performed intervention corresponds to the selected button.

In some or all examples, the intervention comprises: moving visual activity content on a display of the portable electronic device in terms of its relative position on the display of the portable electronic device.

In some or all examples, the intervention comprises outputting visual activity content associated with the visual activity to an auxiliary display.

In some or all examples, the auxiliary display is an in-vehicle display.

In some or all examples, the auxiliary display is a head-worn display.

In some or all examples, the criteria for performing an intervention further comprises a determination that any of one or more decision metrics is greater than or equal to a respective threshold, wherein the respective threshold of each decision metric indicates a high risk of motion sickness if a user were to continue to use the portable electronic device for visual activities.

In accordance with a further aspect of the present disclosure, there is provided a computing device comprising a processor system and a memory, the memory having tangibly stored thereon executable instructions that, in response to execution by the processor system, cause the processor system to perform the methods described above and herein. The computing device may be a vehicle control system for a vehicle and the vehicle control system may comprise a computer vision system, the vehicle control system or computer vision system, as the computing device, being configured to perform the methods described above and herein.

In accordance with a further aspect of the present disclosure, there is provided a vehicle comprising a mechanical system for moving the vehicle, a drive control system coupled to the mechanical system for controlling the mechanical system and a vehicle control system coupled to the drive control system. The vehicle control system may comprise a computer vision system. The vehicle control system or computer vision system, as the host device, is configured to perform the methods described above and herein.

In accordance with a further aspect of the present disclosure, there is provided a non-transitory machine-readable medium having tangibly stored thereon executable instructions for execution by a processor system. The executable instructions, in response to execution by the processor system, cause the processor system to perform the methods described above and herein.

Other aspects and features of the present disclosure will become apparent to those of ordinary skill in the art upon review of the following description of specific implementations of the application in conjunction with the accompanying figures.

BRIEF DESCRIPTION OF THE DRAWINGS

FIGS. 17A-C represent an example of a series of visual user interface screens for implementing the multi-display intervention of FIG. 16 in accordance with one embodiment of the present disclosure.

FIGS. 18A-C represent an example of a series of visual user interface screens for terminating an intervention in accordance with one embodiment of the present disclosure.

DETAILED DESCRIPTION OF EXAMPLE EMBODIMENTS

Figure 1:
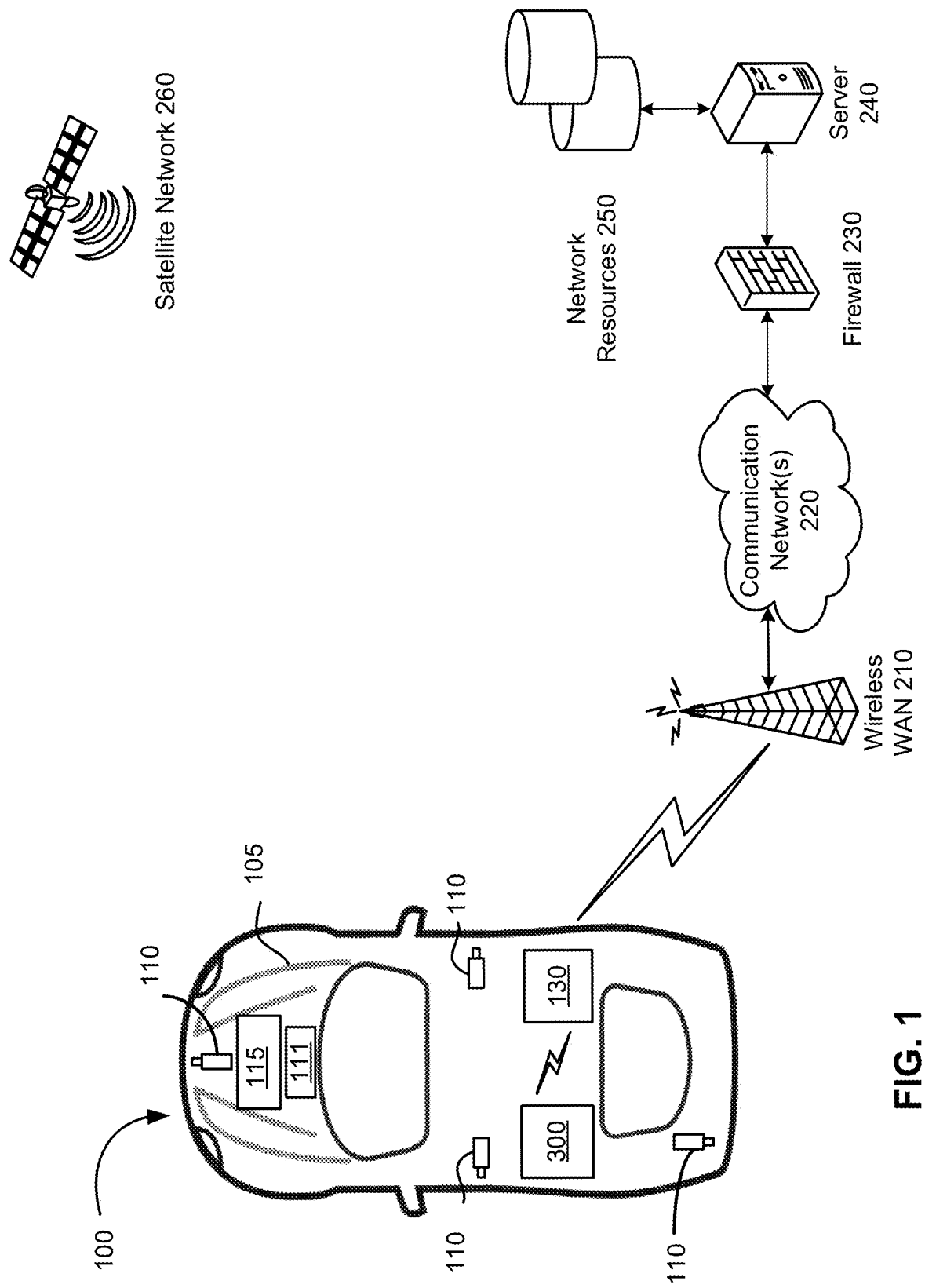
FIG. 1 is a schematic diagram of a communication system suitable for practicing example embodiments of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Individual functions described below may be split or subdivided into multiple functions, or multiple functions may be combined. Lastly, elements referred to in the singular may be plural and vice versa, except where indicated otherwise either explicitly or inherently by context.

The following acronyms and abbreviations are used in the present disclosure:

| Full Name | Acronym/Abbreviation/Initialism |
|---|---|
| Human-machine interaction | HMI |
| Inertial measurement unit | IMU |
| Global Positioning System | GPS |
| Controller Area Network | CAN-bus |
| User interface | UI |

Within the present disclosure, the following sets of terms may be used interchangeably: "detection" and "determination"; "passenger" and "user"; "system" and "module".

For convenience, the present disclosure describes example embodiments of methods and systems with reference to a motor vehicle, such as a car, truck, bus, boat or ship, submarine, aircraft, warehouse equipment, construction equipment, tractor or other farm equipment. The teachings of the present disclosure are not limited to any particular type of vehicle and apply to any type of vehicles that carries passengers.

Figure 2:
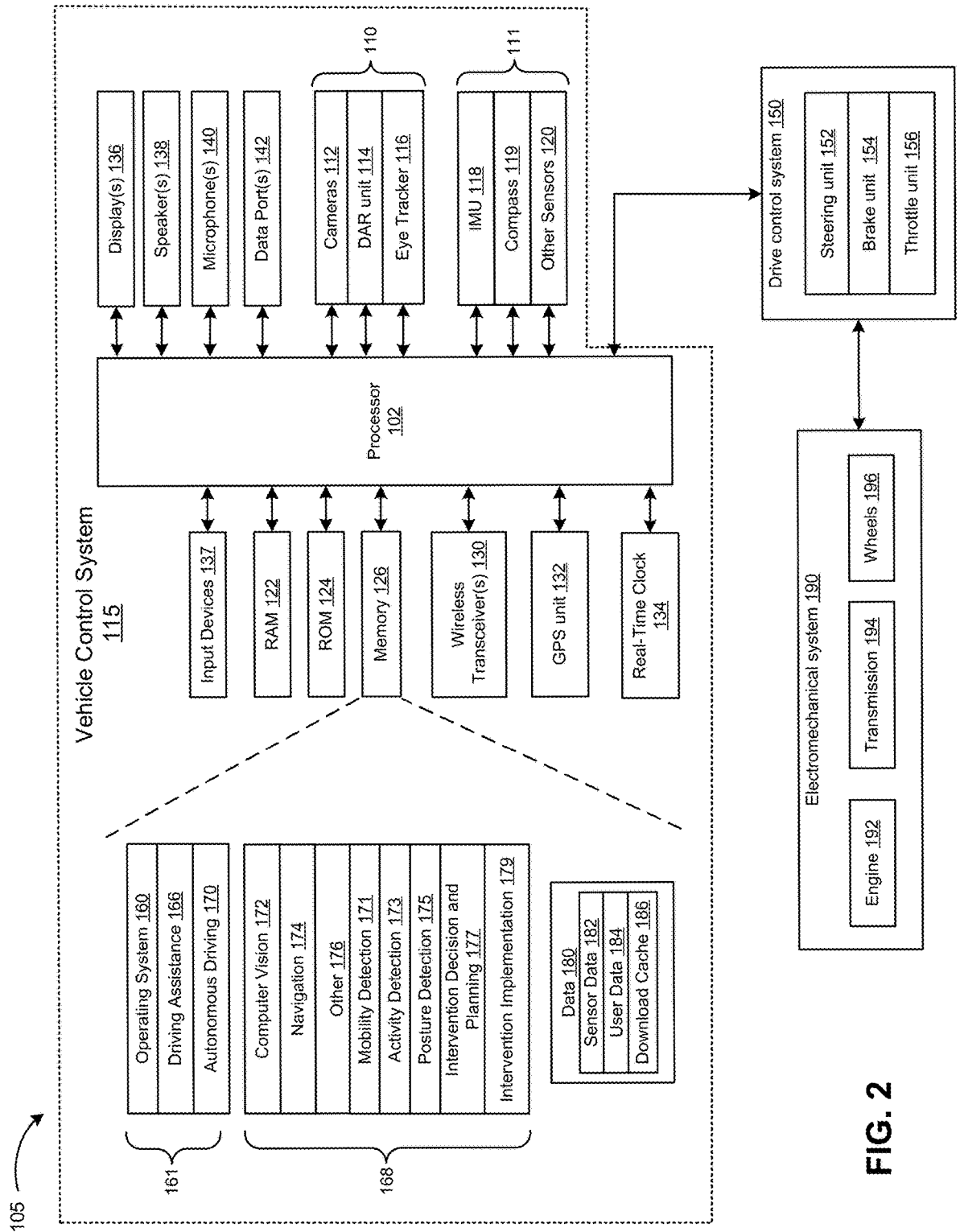
FIG. 2 is a block diagram of a vehicle comprising a vehicle control system in accordance with one example embodiment of the present disclosure.

FIG. 1 is a schematic diagram showing selected components of a communication system 100 in accordance with one example embodiment of the present disclosure. The communication system 100 comprises user equipment in the form of a vehicle control system 115 embedded in a vehicle 105. The vehicle control system 115, shown in greater detail in FIG. 2, is coupled to a drive control system 150 and a mechanical system 190 of the vehicle 105, as described below. The vehicle control system 115 may in various embodiments allow the vehicle 105 to be operable in one or more of a fully-autonomous, semi-autonomous or fully user-controlled mode.

The vehicle 105 includes a plurality of electromagnetic (EM) wave-based sensors 110 that collect data about the external environment surrounding the vehicle 105, and a plurality of vehicle sensors 111 that collect data about the operating conditions of the vehicle 105. The EM wave-based sensors 110 may, for example, include one or more cameras 112 (e.g., red green blue (RGB) cameras) and one or more DAR units 114. The DAR units 114 may comprise one or more LiDAR units and/or one or more radar units (e.g., synthetic aperture radar (SAR) units). The EM wave-based sensors 110 may also include an eye tracker 116. Digital cameras 112 and DAR units 114 are located about the vehicle 105 and are each coupled to the vehicle control system 115, as described below. For each type of externally mounted EM wave-based sensor 110, individual units are mounted or otherwise located to have different fields of view (FOVs) or coverage areas to capture data about the environment surrounding the vehicle 105. Accordingly, the vehicle control system 115 receives data about the external environment of the vehicle 105 as collected by cameras 112 and DAR units 114.

Digital cameras 112 and DAR units 114 may also be located within the vehicle 105 along with the eye tracker 116, the internal digital cameras 112 and DAR units 114 and the eye tracker 116 are also coupled to the vehicle control system 115. The internal digital cameras 112 and DAR units 114 and the eye tracker 116 may be used by a computer vision 172 of the vehicle control system 115 to identify passengers, a postural position of the passengers, a viewing angle (also known as eye gaze direction and eye gaze angle) of the passengers, for example, relative to a horizontal or vertical reference, and/or a wakeful/sleepiness state of the passengers, among other things.

Vehicle sensors 111 may include an inertial measurement unit (IMU) 118 that senses the vehicle's specific force, angular rate, and optionally orientation using a combination of accelerometers, gyroscopes and optionally magnetometers, an electronic compass 119, and other vehicle sensors 120 such as a speedometer, a tachometer, wheel traction sensor, transmission gear sensor, throttle and brake position sensors, and steering angle sensor. The vehicle sensors 111, when active, repeatedly (e.g., in regular intervals) sense the environment and provide sensor data based on environmental conditions to the vehicle control system 115 in real-time or near real-time. The vehicle control system 115 may collect data about a position and orientation of the vehicle 105 using signals received from a GPS unit (GPS unit) 132 and the IMU 118. The vehicle control system 115 may determine a linear speed, angular speed, acceleration, engine revolutions per minute (RPM), transmission gear and tire grip of the vehicle 105, among other factors, using data from one or more of the GPS units 132, the IMU 118, and other vehicle sensors 120.

The vehicle control system 115 may comprises one or more wireless transceivers 130 that enable the vehicle control system 115 to exchange data and optionally voice communications with a wireless wide area network (WAN) 210 of the communication system 100. The vehicle control system 115 may use the wireless WAN 210 to access a server 240, such as a driving assist server, via one or more communications networks 220, such as the Internet. The server 240 may be implemented as one or more server modules in a data center and is typically located behind a firewall 230. The server 240 is connected to network resources 250, such as supplemental data sources that may be used by the vehicle control system 115.

The communication system 100 comprises a satellite network 260 comprising a plurality of satellites in addition to the wireless WAN 210. The vehicle control system 115 comprises the GPS unit 132 (FIG. 2) that may use signals received by the GPS unit 132 from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS).

FIG. 2 illustrates selected components of the vehicle 105 in accordance with an example embodiment of the present disclosure. As noted above, the vehicle 105 comprises a vehicle control system 115 that is connected to a drive control system 150 and a mechanical system 190 as well as to the EM wave-based sensors 110 and the vehicle sensors 111. The vehicle 105 also comprises various structural elements such as a frame, doors, panels, seats, windows, mirrors and the like that are known in the art but that have been omitted from the present disclosure to avoid obscuring the teachings of the present disclosure. The vehicle control system 115 includes a processor system which controls the overall operation of the vehicle control system 115. The processor system may include one or more processing units (e.g., processor 102), including for example one or more central processing units (CPUs), one or more graphical processing units (GPUs), one or more tensor processing units (TPUs), and other processing units. The processor 102 is coupled to a plurality of components via a communication bus (not shown) which provides a communication path between the components and the processor 102. The processor 102 is coupled to a drive control system 150, Random Access Memory (RAM) 122, Read Only Memory (ROM) 124, persistent (non-volatile) memory 126 such as flash erasable programmable read only memory (EPROM) (flash memory), wireless transceiver(s) 130 for exchanging radio frequency signals with the wireless WAN 210, a GPS unit 132 for receiving satellite signals from the satellite network 260, a real-time clock 134, and one or more displays 136. One or more displays 136 may be located in a vehicle dashboard for use by the driver and/or front seat passenger. A display 136 may also be located in the back of headrest of each of the driver's seat and the front seat passenger's seat for use by rear seat passenger(s). In some examples, a display 136 may be provided for, and associated with, each passenger seat in the vehicle 105 so that the vehicle control system 115 may perform individual actions associated with each passenger or passenger seat.

The wireless transceiver(s) 130 may comprise one or more cellular (RF) transceivers for communicating with a plurality of different radio access networks (e.g., cellular networks) using different wireless data communication protocols and standards. The vehicle control system 115 may communicate with any one of a plurality of fixed transceiver base stations (one of which is shown in FIG. 1) of the wireless WAN 210 (e.g., cellular network) within its geographic coverage area. The one or more wireless transceiver(s) 130 may send and receive signals over the wireless WAN 210. The wireless transceiver(s) 130 may comprise a multi-band cellular transceiver that supports multiple radio frequency bands.

The wireless transceiver(s) 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol. The wireless transceiver(s) 130 may also comprise a short-range wireless transceiver, such as a Bluetooth® transceiver, for communicating with a mobile computing device, such as a smartphone or tablet. The wireless transceiver(s) 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The wireless transceiver(s) 130 may be used to connect to portable electronic devices 300 (FIG. 3) of passengers of the vehicle 105 with the vehicle control system 115 using a suitable wireless connection or possibly a wired connection via a data port 142. The vehicle control system 115 may perform a computer-implemented method of preventing motion sickness in accordance with the present disclosure using the wireless or wired connection with the portable electronic devices 300.

The real-time clock 134 may comprise a crystal oscillator that provides accurate real-time time data. The time data may be periodically adjusted based on time data received through GPS unit 132 or based on time data received from network resources 250 executing a network time protocol.

The display(s) 136 may be a touchscreen such as a capacitive touchscreens that comprises a color liquid crystal display (LCD), light-emitting diode (LED) display or active-matrix organic light-emitting diode (AMOLED) display and a touch-sensitive input surface or overlay connected to an electronic controller. Additional input devices 137 coupled to the processor 102 may also be provided in addition to the touch-sensitive input surface including buttons, switches and dials. Alternatively, non-touch-sensitive display may be provided with input devices 137 for user interaction with a visual user interface (VUI) displayed hereon.

The vehicle control system 115 also includes one or more speakers 138, one or more microphones 140 and one or more data ports 142 such as serial data ports (e.g., Universal Serial Bus (USB) data ports). The vehicle control system 115 may also include other sensors such as tire pressure sensors (TPSs), door contact switches, light sensors, proximity sensors, etc.

The drive control system 150 serves to control movement of the vehicle 105. The drive control system 150 comprises a steering unit 152, a brake unit 154 and a throttle (or acceleration) unit 156, each of which may be implemented as software modules or control blocks within the drive control system 150. The steering unit 152, brake unit 154 and throttle unit 156 process, when in fully or semi-autonomous driving mode, receives navigation instructions from an autonomous driving system 170 (for autonomous driving mode) or a driving assistance system 166 (for semi-autonomous driving mode) and generates control signals to control one or more of the steering, braking and throttle of the vehicle 105. The drive control system 150 may include additional components to control other aspects of the vehicle 105 including, for example, control of turn signals and brake lights.

The electromechanical system 190 receives control signals from the drive control system 150 to operate the electromechanical components of the vehicle 105. The electromechanical system 190 effects physical operation of the vehicle 105. The electromechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

A VUI of the vehicle control system 115 is rendered and displayed on one of the display(s) 136 by the processor 102. A user may interact with the VUI using the display 136 and optionally other input devices 137 (e.g., buttons, dials) to select a driving mode for the vehicle 105 (e.g., fully autonomous driving mode or semi-autonomous driving mode) and to display relevant data and/or information, such as navigation information, driving information, parking information, media player information, climate control information, etc. The VUI may comprise a series of traversable content-specific menus.

The memory 126 of the vehicle control system 115 has stored thereon a plurality of software modules 161 in addition to the VUI, each software system 161 including instructions that may be executed by the processor 102. The software modules 161 include an operating system 160, the driving assistance system 166 for semi-autonomous driving, and the autonomous driving system 170 for fully autonomous driving. Both the driving assistance system 166 and the autonomous driving system 170 may include one or more of a navigation planning and control module, a vehicle localization module, parking assistance module, and autonomous parking module. The memory 126 also has stored thereon software modules 168 that may be invoked by either the driving assistance system 166 or the autonomous driving system 170. The software modules 168 include a computer vision module 172 and a navigation module 174 separate from the navigation planning and control module of the autonomous driving system 170, for example, for use in a fully user-controlled mode. Other software modules 176 may include for example a mapping module, a climate control module, a media player module, a telephone module and a messaging module. The software modules 176 may also comprise a mobility detection module 171, an activity detection module 173, a posture detection module 175, an intervention decision and monitoring module 177, and an intervention implementation module 179.

Although the software modules 168 and navigation module 174 are shown as separate modules that may be invoked by the driving assistance system 166 for semi-autonomous driving and/or the autonomous driving system 170, one or more of the software modules 168 may be combined with one or more of the other modules 176 in some embodiments. For example, the mobility detection module 171, activity detection module 173, posture detection module 175, intervention decision and monitoring module 177, and intervention implementation module 179 may be combined.

The memory 126 also stores a variety of data 180. The data 180 may comprise sensor data 182 received from the EM wave-based sensors 110, user data 184 comprising user preferences, settings and optionally personal media files (e.g., music, videos, directions, etc.), and a download cache 186 comprising data downloaded via the wireless transceivers 130 including, for example, data downloaded from network resources 250. The sensor data 182 may comprise image data from the cameras 112, 3D data from the DAR units 114, IMU data from the IMU 118, compass data from the electronic compass 119, and other sensor data from other vehicle sensors 120. The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data and/or information. Data received by the vehicle control system 115 may also be stored in the RAM 122. Although specific functions are described for various types of memory, this is merely one example, and a different assignment of functions to types of memory may also be used.

Figure 3:
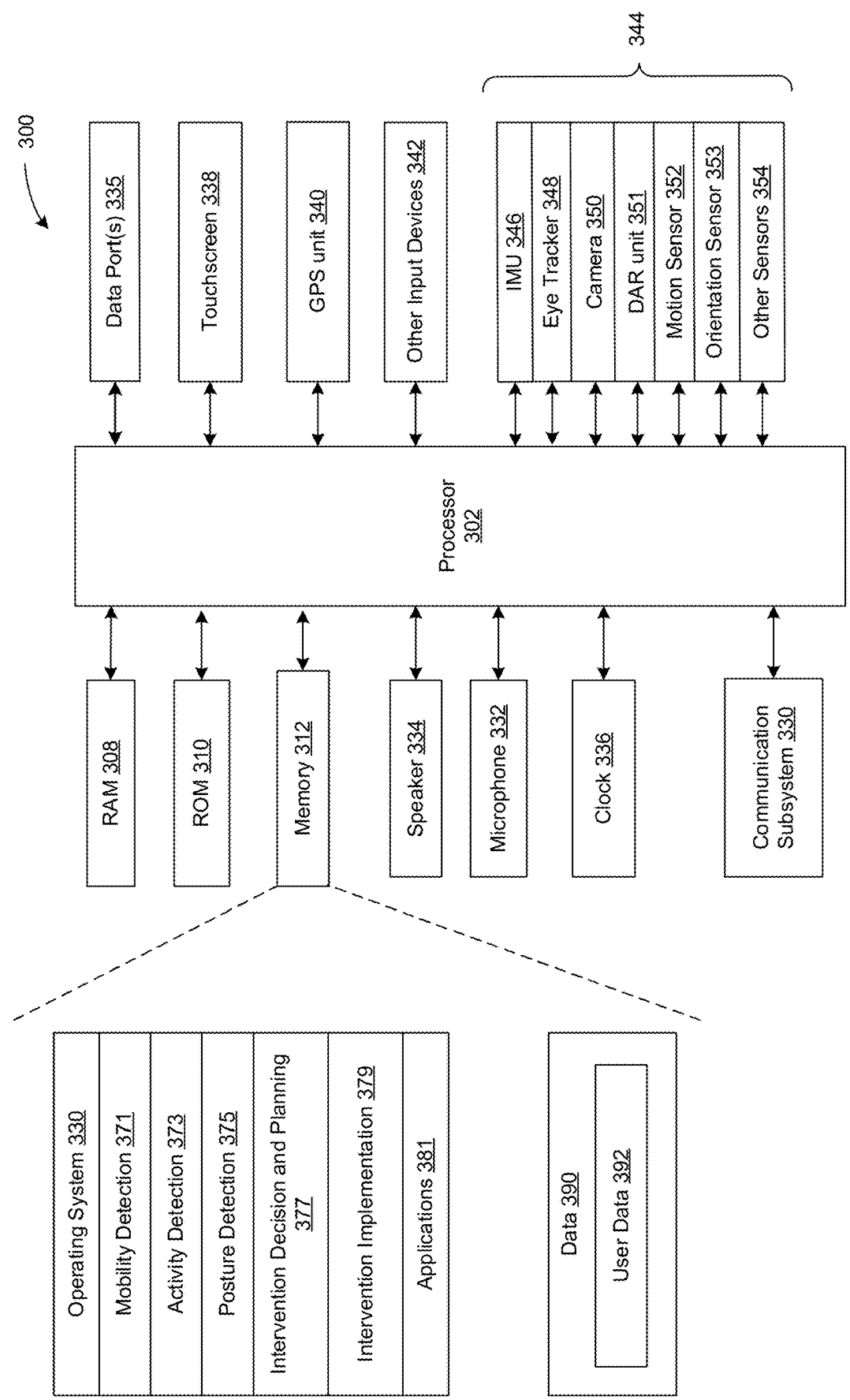
FIG. 3 is a block diagram of a portable electronic device in accordance with one example embodiment of the present disclosure.

Reference is next made to FIG. 3 which illustrates a portable electronic device 300 in accordance with one example embodiment of the present disclosure. In at least some examples, the portable electronic device 300 is a portable wireless communication device and may be a handheld portable electronic device. Examples of the portable electronic device 300 include but are not limited to a smartphone, tablet, smartwatch, smart glasses, head-mounted display, e-reader, portable gaming console, or laptop computer. The portable electronic device 300 includes a processor system which controls the overall operation of the portable electronic device 300. The processor 102 may include one or more processing units (e.g., processor 302), including for example one or more CPUs, one or more GPUs, one or more TPUs, and other processing units. The processor 302 is coupled to a plurality of components via a communication bus (not shown) which provides a communication path between the components and the processor 302. The processor 302 is coupled to RAM 308, ROM 310, and persistent memory 312 such as flash memory and a communication subsystem 330.

The communication subsystem 330 includes one or more wireless transceivers for exchanging radio frequency signals with wireless networks. The communication subsystem 330 may also include a wireline transceiver for wireline communications with wired networks. The wireless transceivers may include one or a combination of Bluetooth transceiver or other short-range wireless transceiver, a Wi-Fi or other WLAN transceiver for communicating with a WLAN via a WLAN AP, or a WWAN transceiver such as a cellular transceiver for communicating with a radio access network. The cellular transceiver may communicate with any one of a plurality of fixed transceiver base stations of the cellular network within its geographic coverage area. The wireless transceivers may include a multi-band cellular transceiver that supports multiple radio frequency bands. Other types of short-range wireless communication include NFC, IEEE 802.13.3a (also referred to as UWB), Z-Wave, ZigBee, ANT/ANT+ or infrared (e.g., IrDA communication).

The portable electronic device 300 also comprises a microphone 332, a speaker 334, a clock 336, a display which may be a touchscreen 338, and a GPS unit 340 for receiving satellite signals from a satellite network that includes a plurality of satellites which are part of a global or regional satellite navigation system, each coupled to the processor 302. The touchscreen 338 is typically a capacitive touchscreen.

The portable electronic device 300 also comprises a plurality of sensors 344 coupled to the processor 302. The sensors 344 comprise an IMU 346 that senses the specific force, angular rate, and optionally orientation using a combination of accelerometers, gyroscopes and optionally magnetometers, an eye tracker 348 for detecting a viewing angle of the passengers (for example, relative to a horizontal or vertical reference), and a digital camera 350 (e.g., RGB camera). The sensors 344 may also comprise one or a combination of a DAR unit 351, a motion sensor (which may comprise an accelerometer) 352, an orientation sensor 353 (which may comprise an accelerometer) and other sensors 354, electronic compass, altimeter, an IR sensor, a proximity sensor or a biometric sensor such as face scanner or fingerprint scanner, possible embodiments.

The portable electronic device 300 may also comprise one or more other input devices 342 such as buttons, switches, dials, a keyboard or keypad, or navigation tool, depending on the type of the portable electronic device 300. The portable electronic device 300 may also comprise one or more data ports 335 such as serial data ports (e.g., USB data ports).

The persistent memory 312 stores a variety of data 390, including sensor data acquired by the sensors 344, location data about the location of the portable electronic device 300, input data acquired by the touchscreen 338 and/or other input devices 342, user data 382, user preferences, settings a download cache including data downloaded via the wireless transceivers, and saved files. System software, software modules, specific device applications, or parts thereof, may be temporarily loaded into RAM 308. Communication signals received by the portable electronic device 300 may also be stored in RAM 308. Although specific functions are described for various types of memory, this is merely one embodiment, and a different assignment of functions to types of memory may be used in other embodiments.

The portable electronic device 300 may also comprise a battery (not shown) as a power source, such as one or more rechargeable batteries that may be charged, for example, through charging circuitry coupled to a battery interface such as the serial data port. The battery provides electrical power to at least some of the components of the portable electronic device 300, and the battery interface (not shown) provides a mechanical and electrical connection for the battery.

The persistent memory 312 of the portable electronic device 300 has stored thereon a plurality of software modules executable by the processor 302, each software module including instructions that may be executed by the processor 302. The software modules include an operating system 330 that provides a VUI for user interaction with the portable electronic device 300 in the form of touch inputs detected via the touchscreen 338 and/or other input devices 342. The software modules include a mobility detection module 371, an activity detection module 373, a posture detection module 375, an intervention decision and monitoring module 377, and an intervention implementation module 379. The software modules also comprise other applications 381 such as applications for visual activities on the touchscreen 338. Non-limiting examples of the applications for visual activities which may be installed on the portable electronic device 300 include an Internet browser for browsing the Internet, an e-reader application for reading electronic books, a news application for reading news articles, a word processing application for writing, an art application for sketching or drawing, a photo application for viewing photos, a video application for watching videos (such as movies, TV shows, or the like), and games.

Methods for Preventing Motion Sickness Via Postural Analysis

The methods for preventing motion sickness via postural analysis of the present disclosure can be performed in whole, or in part, on the portable electronic device 300 or vehicle control system 115 depending on one or a combination of the available hardware and/or software features of the vehicle control system 115 available for the respective passengers, the presence and/or type of connectivity between the portable electronic device 300 and vehicle control system 115, the user settings and system settings/configuration. The software modules used for implementing the methods, i.e. the mobility detection module, activity detection module, posture detection module, intervention decision and monitoring module, and intervention implementation module may be located on the portable electronic device 300 or vehicle control system 115 depending on where the respective step is performed.

Figures 4A, 4B:
FIG. 4A is a schematic diagram showing a passenger's posture in an unhealthy position prone to induce motion sickness.
FIG. 4B is a schematic diagram showing a passenger's posture after an intervention changing the passenger's posture to a healthy position which is less likely to induce motion sickness.

The method for preventing motion sickness of the present disclosure is intended to help a passenger keep a healthy posture when using a portable electronic device for visual activities to prevent motion sickness, and in particular to when using a portable electronic device for visual activities to prevent motion sickness in a moving vehicle. FIG. 4A shows a passenger's posture in an unhealthy position prone to induce motion sickness whereas FIG. 4B shows a passenger's posture after an intervention changing the passenger's posture a healthy position which is less likely to induce motion sickness. The method of the present disclosed is intended to change a passenger's posture from the unhealthy position of FIG. 4A to the healthy position of FIG. 4B in response to a detection of an unhealthy position/posture. The technical problems that the method of the present disclosure aims to resolve include detecting when a user/passenger is looking down and using a portable electronic device for visual activities, identifying an appropriate timing to intervene in a passenger's visual activities and implement an intervention, keeping a passenger reading at a healthy posture via HMI-based methods to prevent or avoid motion sickness. An optional technical problem is detecting when the passenger is in a moving vehicle.

The present disclosure describes methods and systems for preventing motion sickness via postural analysis. The postural analysis detects when a passenger is looking down. A number of different factors may be considered to determine when the portable electronic device is being used for visual activities such as one or a combination of a state of the display of the portable electronic device, the content being displayed on the display of the portable electronic device, the current activity and active application of the portable electronic device may be used to determine. An appropriate timing for an intervention is determined, which may be after detecting the passenger is looking down and the portable electronic device is being used for visual activities for a certain period, and/or certain vehicle motions or other factors that could cause motion sickness meet or exceed a certain threshold. An appropriate intervention to change the passenger's posture from an unhealthy posture to a healthy posture is performed at the determined appropriate time. The appropriate intervention may be selected by the user, predetermined or dynamically determined. The intervention may prevent the user from continue to use their portable electronic device for visual activities in an unhealthy posture or merely encourage them to do so, depending on the embodiment. Two possible interventions include using a posture-based intervention on the portable electronic device 300 and a multi-display-based interaction via communication between the portable electronic device 300 and in-vehicle display. Both interventions aim to help a passenger use their portable electronic device for visual activities at eye level to prevent or avoid motion sickness. The method and system may be configured to be performed only when the passenger is in a moving vehicle, which may be determined using one or a combination of sensor data from a motion sensor and location data from a GPS unit.

Figure 5:
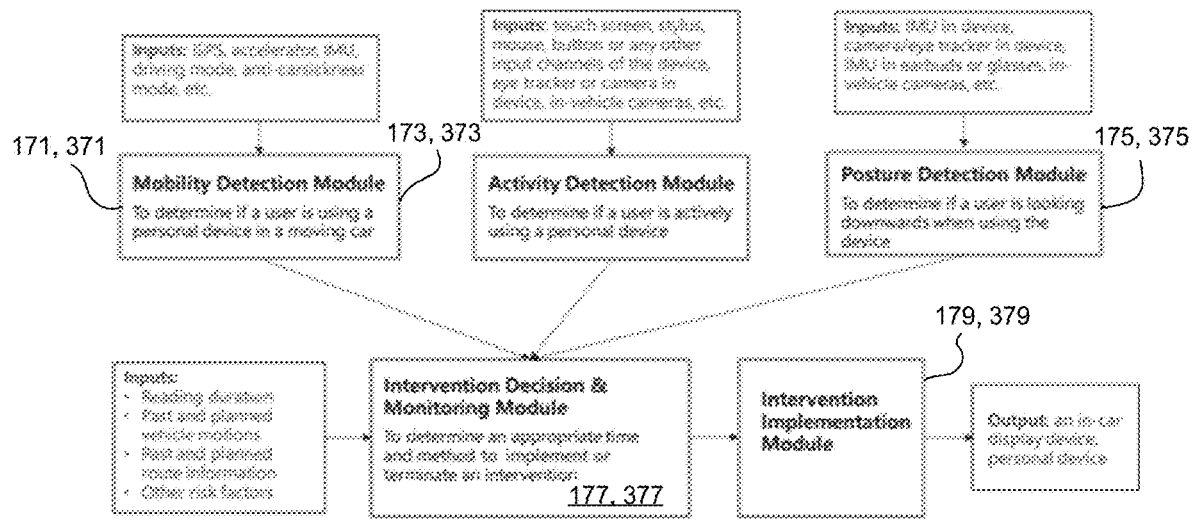
FIG. 5 is a schematic diagram of the system architecture is a schematic diagram.

A primary application scenario of the method and system of the present disclosure involves a passenger using their portable electronic device 300 for visual activities (e.g., reading) while in a moving vehicle 105, which can be equipped with or without in-vehicle displays. For example, a display 136 may also be located in the back of headrest of each of the driver's seat and the front seat passenger's seat for use by rear seat passenger(s). In some examples, a display 136 may be provided for, and associated with, each passenger seat in the vehicle 105 so that the vehicle control system 115 may perform individual actions associated with each passenger or passenger seat FIG. 5 is a schematic block diagram showing the system architecture of present disclosure. As noted above, there are five main software modules: a mobility detection module 171/371, an activity detection module 173/373, a posture detection module 175/375, an intervention decision and monitoring module 177/377, and an intervention implementation module 179/379. FIG. 5 shows the primary inputs and outputs of each module.

The mobility detection module 171/371 determines whether a user is using a portable electronic device 300 in a moving vehicle 105. The mobility detection module 171/

371 can receive inputs from the following channels: (1) built-in motion sensor (s) 352 of the portable electronic device 300, location data from the GPS unit 340, sensor data from an IMU 346 or an accelerometer-based; (2) Cross-system communication to obtain vehicle motion status, e.g. a portable electronic device 300 connects to the vehicle control system 115 via Bluetooth® or other wireless or wired methods; (3) Driving-related mode of a portable electronic device 300, e.g. a "driving mode" or "anti-motion sickness mode" (also known as "motion sickness prevention mode" or the like) on the a portable electronic device 300 is turned on (e.g., active).

The activity detection module 173/373 determines whether a user is actively using a portable electronic device 300 for visual activities. The activity detection module 173/373 can receive inputs from the following channels: touchscreen 338, stylus, mouse, button or any other input channels 342 of the portable electronic device 300, an eye tracker 348 or camera 350 of the portable electronic device 300, the operating system 330 of the portable electronic device 300 which may provide a display state of the touchscreen 338 of the portable electronic device 300 (e.g., screen on or off due to activity timeout or the like), the content being displayed on the touchscreen 338 of the portable electronic device 300, the current activity, and/or an active application of the portable electronic device 300 (which may be used to determine when the portable electronic device is being used for visual activities), or an in-vehicle eye tracker 116 or camera 112.

The posture detection module 175/375 determines whether a user is looking downwards when using the portable electronic device 300. The posture detection module 175/375 can receive inputs from the following channels: motion (detection) sensor(s) (e.g., IMU 346), camera(s) 350 or eye tracker(s) 348 or orientation sensors 353 of the portable electronic device 300, or motion detection sensors (e.g., IMU) or orientation sensors in earphones, glasses (such as smart glasses) or head-worn display, in-vehicle camera(s) 112 or in-vehicle eye tracker(s) 116, etc.

The intervention decision and monitoring module 177/377 monitors the states from all input channels and determines a time and method to implement an intervention, or to terminate an intervention whether an intervention is already implemented. In addition to receiving inputs from the mobility detection module, activity detection module and posture detection module, the intervention decision and monitoring module 177/377 may optionally also receives and monitors inputs from the following channels: (1) past and/or present visual activity (e.g., reading) duration monitored by and determined by the processor 302 of the portable electronic device 300 (e.g., for example, by the operating system 330); (2) past and/or planned/pending vehicle motions via CAN-bus (Controller Area Network) or motion schedule system of the vehicle 105 such as longitudinal acceleration, lateral acceleration, shaking of the vehicle body, speed, etc.—past information may be monitored and tracked by the vehicle control system 115 whereas planned/pending vehicle motions may be provided the autonomous driving module 170; (3) past and/or planned/pending route information via navigation system 170, such as curves/turns, road type, road conditions, speed limit, traffic condition, geographic environment, altitude, etc.—past information may be monitored and tracked by the vehicle control system 115 whereas planned/pending route information may be provided the navigation system 170; and (4) risk factors associated with the user and/or visual activity content such as passenger's age, gender, sleep history, illness history, motion sickness history, food/drink intake before the ride, current fatigue level, the current content on the device (e.g. text, videos, games etc.). The above-noted parameters and risk factors may be stored on the portable electronic device 300 and/or on the vehicle control system 115, for example, as a part of a user profile and/or settings of the motion sickness prevention mode.

Once a decision is made to implement or terminate an intervention by the intervention decision and monitoring module 177/377, the intervention implementation module 179/379 then implements or terminates the intervention. The output of the intervention implementation module 179/379 can be implemented on the portable electronic device 300 that the passenger is using and/or an in-vehicle display device when available.

Figure 6:
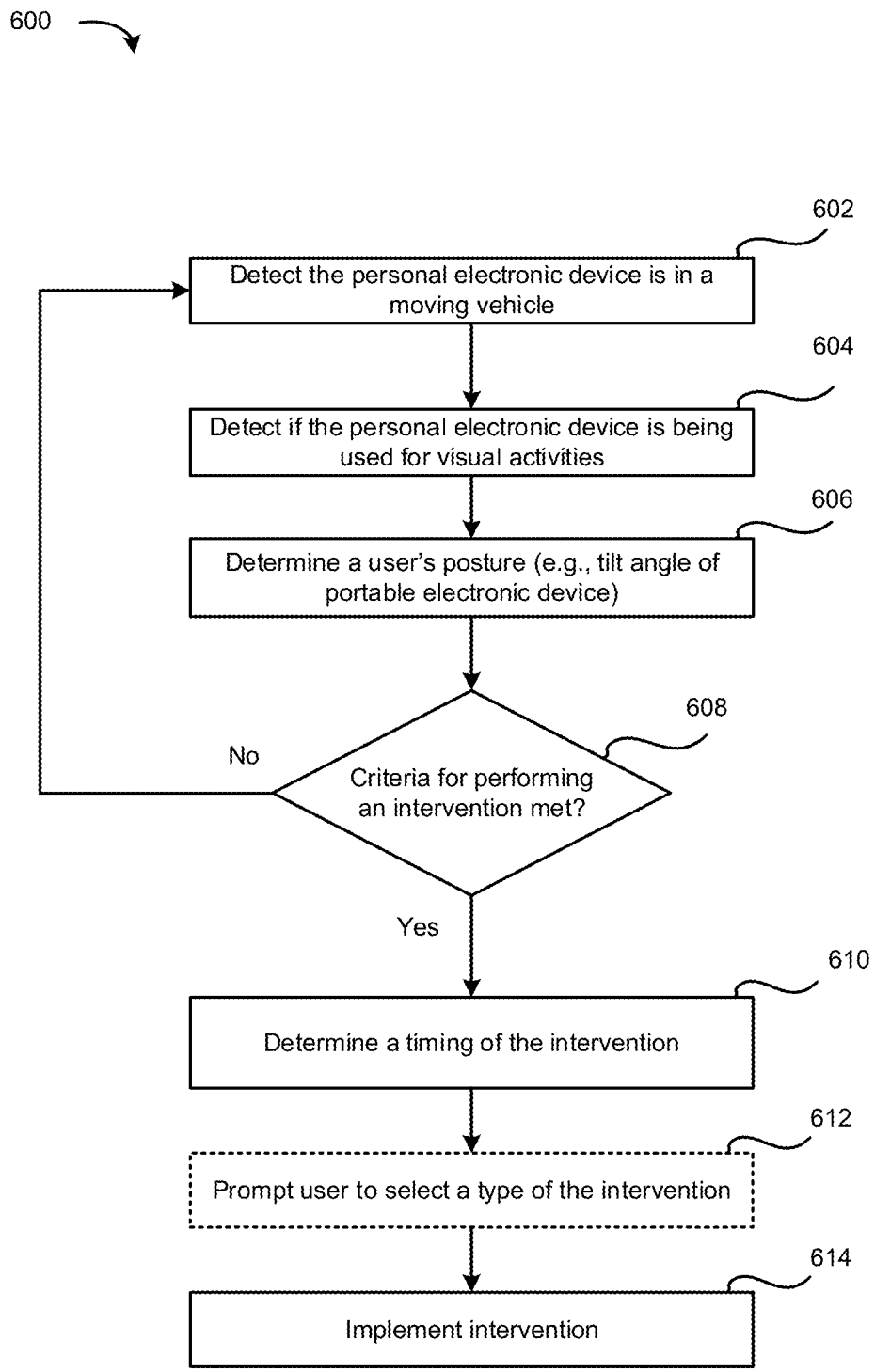
FIG. 6 is a flowchart of a method for preventing motion sickness in accordance with one example embodiment of the present disclosure.

Referring to FIG. 6, a method 600 for preventing motion sickness in accordance with one example embodiment of the present disclosure. The method 600 may be carried out by software executed by the processor of the portable electronic device 300 and/or vehicle control system 115. The method 600 can be implemented on any handheld electronic device equipped with a motion sensor (e.g., IMU) or orientation sensor, such as smartphone, tablet, smartwatch, smart glasses, head-mounted display, e-reader, portable gaming console, or laptop computer. Alternatively, external sensors (e.g., in-vehicle sensors) may be used. When external displays (e.g., in-vehicle displays) are available, the method can be implemented on the external displays via communication between the portable electronic device and the external displays.

At step 602, a processor of the portable electronic device 300 and/or vehicle control system 115 detects whether the portable electronic device 300 is in a moving vehicle 105. As noted above, a motion sensor such as an IMU or location data from a GPS unit may be used to detect whether the portable electronic device 300 is in a moving vehicle 105. The motion sensor or GPU unit detects and reports when the portable electronic device 300 is in motion and optionally detects and reports the speed and/or acceleration. In some examples, when the portable electronic device 300 is determined by the processor to be in motion, the processor determines whether the detected speed is greater than a speed threshold at or above which it is determined by the processor that the portable electronic device 300 is in a moving vehicle 105. In some examples, the speed threshold is 20-30 km/h which has been determined to be a threshold indicative of being in a moving vehicle 105 while also being a speed below which motion sickness is less common. Below 20-30 km/h, the speed can be attributed to other forms of motion such as walking, running or cycling.

At step 604, a processor of the portable electronic device 300 and/or vehicle control system 115 detects whether the portable electronic device 300 is being used for visual activities. As noted above, the determination as to whether the portable electronic device 300 is being used for visual activities may be based on inputs from the touchscreen 338, stylus, mouse, button or any other input channels of the portable electronic device 300, an eye tracker 348 or camera 350 of the portable electronic device 300, an in-vehicle eye tracker 116 or an in-vehicle camera 112, or information provided by the operating system 330 of the portable electronic device 300 which may be used to determine when the portable electronic device is being used for visual activities. The information provided by the operating system 330 of the portable electronic device 300 may include a display state of the touchscreen 338 of the portable electronic device 300 (e.g., screen on or off due to activity timeout or the like), the content being displayed on the touchscreen 338 of the portable electronic device 300, the current activity, and/or an active application of the portable electronic device 300.

In some examples, if the portable electronic device 300 has detected a touch event via the touchscreen 338 (such as a tap or swipe) within a predetermined duration from the determining time, the system determines that the user is actively using the portable electronic device 300 for visual activities. In some examples, if the portable electronic device 300 has not detected a touch event via the touchscreen 338 (such as a tap or swipe) within a predetermined duration from the determining time, the system determines that the user is not actively using the portable electronic device 300 for visual activities. Other inputs may be considered in addition to touch events via the touchscreen 338 may also be considered.

In some examples, if an eye tracker 348 or camera 350 of the portable electronic device 300 or vehicle 105 are determined to observe the user looking or gazing at the touchscreen 338, which may involve computer vision analysis based on acquired sensor data (which may comprise an image), the system determines that the user is actively using the portable electronic device 300 for visual activities.

In some examples, if information provided by the operating system 330 of the portable electronic device 300 indicates that the touchscreen 338 or other display of the portable electronic device 300 is on, the system determines that the user is actively using the portable electronic device 300 for visual activities.

In some examples, if information provided by the operating system 330 of the portable electronic device 300 indicates that content is actively being displayed on the touchscreen 338 or other display of the portable electronic device 300, the system determines that the user is actively using the portable electronic device 300 for visual activities.

In some examples, if information provided by the operating system 330 of the portable electronic device 300 indicates that a current activity of the portable electronic device 300 or an active application of the portable electronic device 300 which is associated with visual activities based on a set of predetermined associations, the system determines that the user is actively using the portable electronic device 300 for visual activities. For example, the portable electronic device 300 and/or vehicle control system 115 may have a set of predetermined associations between a set of selected activities and whether those activities are visual activities, and between a set of selected applications and whether those applications are associated with visual activities (e.g., reading, gaming, watching movies or the like). The set of predetermined associations may be configurable, for example, by the user.

In other examples, the processor of the portable electronic device 300 and/or vehicle control system 115 may detects whether the portable electronic device 300 is being used in any way regardless of whether the use is for visual activities. In some such examples, any input within the predetermined duration may be sufficient to determine the user is actively using the portable electronic device 300.

At step 606, a processor of the portable electronic device 300 and/or vehicle control system 115 detects the user's posture and determines whether a user is looking downwards. As noted above, the posture can be determined by motion sensor(s) (e.g., IMU 346), orientation sensors, camera(s) or eye tracker(s) of the portable electronic device 300 or in the vehicle 105. When an eye tracker or camera are used, this may involve computer vision analysis based on acquired sensor data (which may comprise an image). In at least some examples, determining whether a user is looking downwards comprises determining a tilt angle ($\alpha$) of the portable electronic device 300 and whether the tilt angle ($\alpha$) is between 0 degrees and a threshold tilt angle. The tilt angle may be determined relative to a horizontal or vertical reference, depending on the embodiment.

Figure 7:
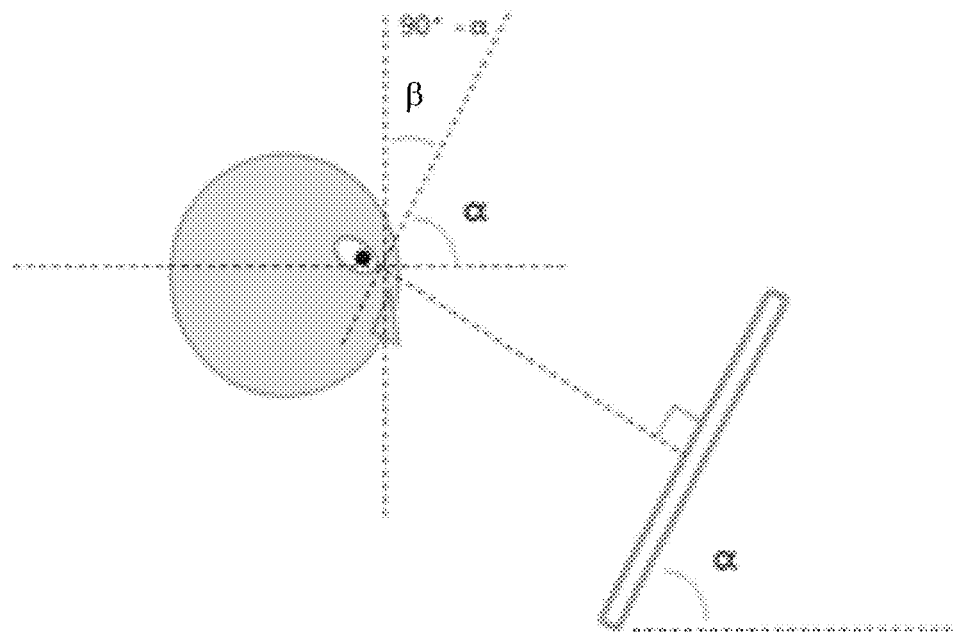
FIG. 7 illustrates a tilt angle ($\alpha$) when a user is looking down.
Figure 8:
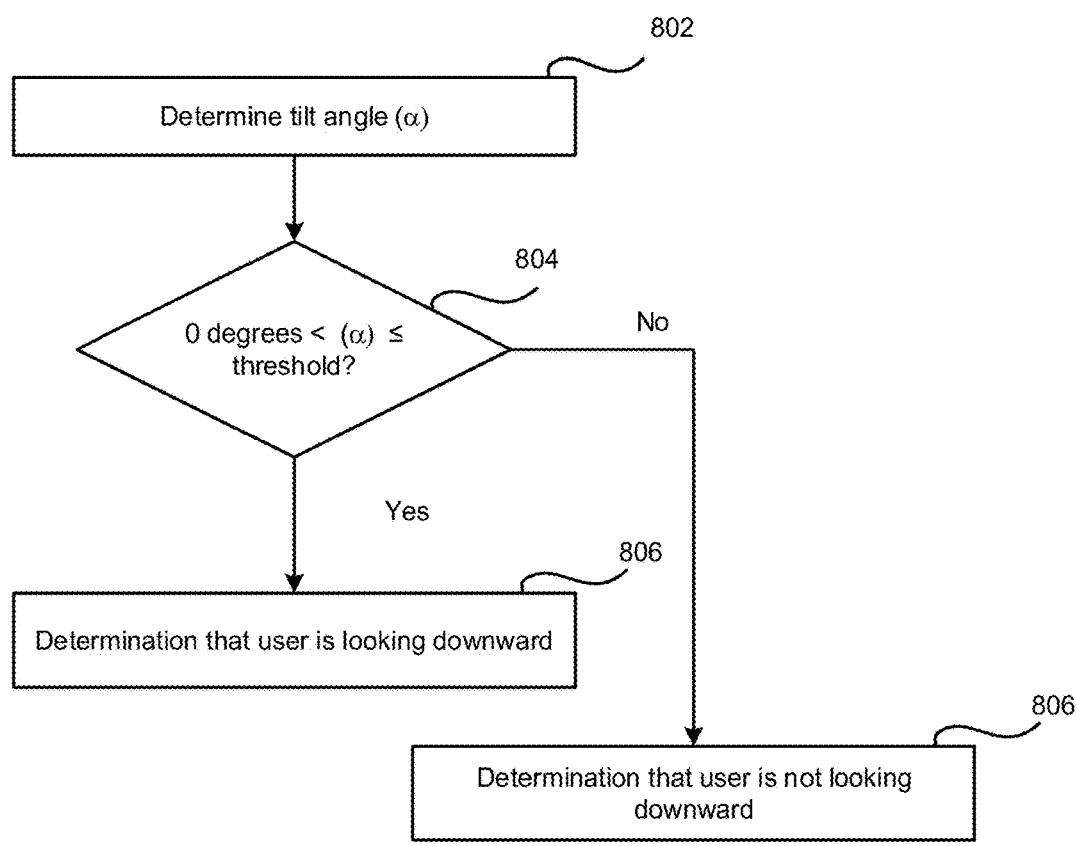
FIG. 8 is a flowchart of a method of determining whether a user is looking down in accordance with an embodiment of the present disclosure.

FIG. 7 illustrates a tilt angle ($\alpha$) when a user is looking down, for example, using a portable electronic device for visual activities. FIG. 8 is a flowchart of a method of determining whether a user is looking down in accordance with an embodiment of the present disclosure. At step 802, one or more sensors such as a motion sensor (e.g., IMU), orientation sensor, eye tracker or camera detects or determines an orientation, such as a tilt angle, of the portable electronic device. FIG. 7 shows the tilt angle ($\alpha$) of the portable electronic device 300 relative to a horizontal reference, which represents the degree to which the user tilts their head downwards (90 degree–$\alpha$). At step 804, it is determined whether the tilt angle ($\alpha$) relative to a horizontal reference is between 0 degrees and a threshold tilt angle. The threshold tilt angle relative to a horizontal reference is less than 90 degrees, and in some examples is between 75 and 87.5 degrees, and in some examples between 80 and 85 degrees, and in some examples 85 degrees. The threshold tilt angle may be configurable. At step 806, if the tilt angle ($\alpha$) relative to a horizontal reference is between 0 degrees and a threshold tilt angle, the system determines that user is looking downwards. If the tilt angle ($\alpha$) relative to a horizontal reference is not between 0 degrees and a threshold tilt angle, the system determines that user is not looking downwards. The threshold tilt angle relative to a vertical reference, denoted p and shown in FIG. 7, in some examples is greater than 10 degrees, and in some examples is greater than 15 degrees, and in some examples is between 15 and 90 degrees.

Alternatively, a tilt angle of the user's head, as one of indicators of head orientation, may be used instead of a tilt angle of the portable electronic device 300. The tilt angle of the user's head may be used to directly or indirectly determine whether the user is looking downwards. When the tilt angle of the user's head is to indirectly determine whether the user is looking downwards, the tilt angle of the user's head may be used to infer, or determine, the tilt angle of the portable electronic device 300 which is then used to determine whether the user is looking downwards. In some embodiments, the tilt angle of the user's head may be determined relative a vertical reference whereas the tilt angle of the portable electronic device 300 may be determined relative a horizontal reference. In some examples of such embodiments, the tilt angle of the user's head may be determined as 90 degree–$\alpha$, where a is the tilt angle of the portable electronic device 300. In other examples of such embodiments, the tilt angle of the user's head may be determined differently.

Alternatively, an eye gaze direction of the user may be used relative to a horizontal or vertical reference instead of a tilt angle. The tilt angle of the user's head or eye gaze direction of the user may be determined by in-vehicle cameras 112 and computer vision. The eye gaze direction may be determined by a vector from the display 136 to the eye (and therefore the head), and the head tilt can be inferred based on the device tilt, and the vector between the portable electronic device 300 and the eye. The eye gaze direction of the user may be determined by an in-vehicle eye tracker 116 or an on-device camera tracker on the portable electronic device 300.

Although in the foregoing description determining whether the portable electronic device 300 is being used for visual activities and determining the user's posture are performed in separate steps using the same or different sensor(s), in other embodiments both determinations may be performed at the same time using the same sensor(s), i.e. using a single input source to perform both tasks. For example, in-vehicle cameras 112 can be used as a single input source, with the images captured by the in-vehicle cameras 112 analyzed using computer vision to identify both whether the portable electronic device 300 is being used for visual activities and the user's posture.

At step 608, a processor of the portable electronic device 300 and/or vehicle control system 115 determines whether the criteria for performing an intervention have been met. The criteria for performing an intervention comprises a determination that the user is in a moving vehicle, a determination that the portable electronic device 300 is being used for visual activities, and a determination that the user is looking downward (e.g., in response to a determination that the tilt angle is between 0 degrees and a threshold tilt angle). In response to a determination that the criteria for performing an intervention have been met, a time to implement the intervention is determined at step 610.

Figure 9:
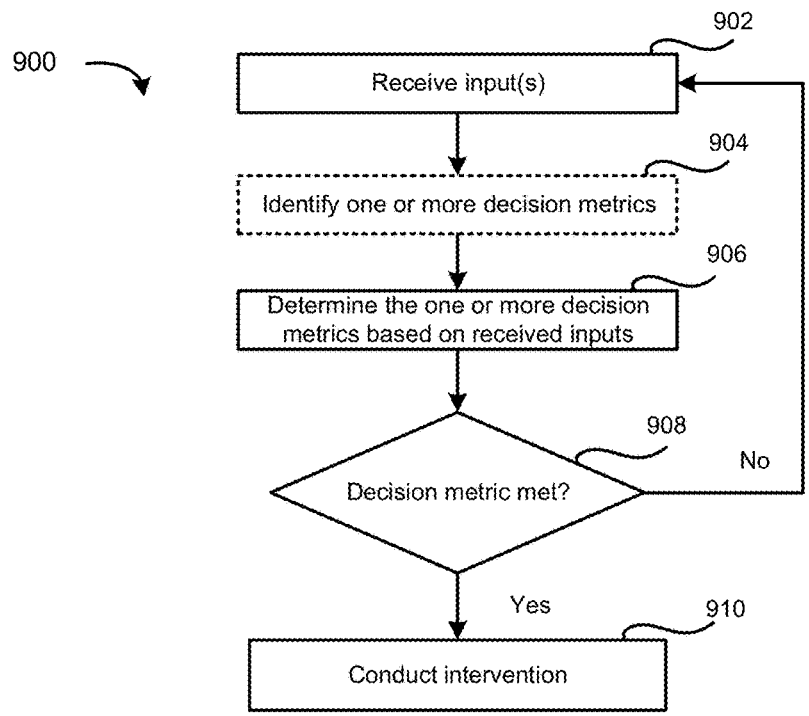
FIG. 9 is a flowchart of a general method of determining a time to conduct an intervention in accordance with an embodiment of the present disclosure.

At step 610, the system determines a time (e.g., an appropriate time) to implement an intervention. The time to implement the intervention may be immediately upon a determination that the criteria for performing an intervention have been met, depending on the embodiment. For example, if the system detects the user is looking down and using portable electronic device 300 for a visual activity in a moving vehicle, then the intervention may be implemented immediately without waiting for a certain duration (duration of 0). The system may monitor all input channels and determines a time to implement an intervention. FIG. 9 is a flowchart of a general method 900 of determining a time to conduct an intervention in accordance with an embodiment of the present disclosure. At step 902, a number of inputs are received from one or more input channels. At step 904, one or more decision metrics are optionally identified for the user. Each decision metric evaluates a likelihood (or risk) of causing motion sickness. The decision metrics may be based on one or more of the following parameters: (1) past and/or present visual activity characteristics such as a the nature of the visual activity or duration; (2) past and/or planned/pending vehicle motions such as longitudinal acceleration, lateral acceleration, shaking of the vehicle body, speed, etc.; (3) past and/or planned/pending route information such as curves/turns, road type, road conditions, speed limit, traffic condition, geographic environment, altitude, etc.; and (4) risk factors associated with the user and/or visual activity content such as passenger's age, gender, sleep history, illness history, motion sickness history, food/drink intake before the ride, current fatigue level, the current content on the device (e.g. text, videos, games etc.). The above-noted parameter and risk factors may be stored on the portable electronic device 300, for example, as a part of the user profile and/or settings of the motion sickness prevention mode. Alternatively, in other embodiments the decision metrics are predetermined and stored in the user profile and/or settings of the motion sickness prevention mode.

At step 906, the one or more decision metrics are determined (e.g., calculated) based on the received inputs. At step 908, it is determined whether any one of the one or more decision metrics met criteria for performing an intervention. In at least some examples, determining whether any one of the one or more decision metrics met criteria for performing an intervention comprises determining whether any one of the one or more decision metrics is greater than or equal to a respective threshold indicating (or suggesting) a high risk of motion sickness if the user continues to use their portable electronic device 300 for visual activities. It will be appreciated that a separate threshold is used for each decision metric. This step is performed by the intervention decision and monitoring module 177/377. If any one of the determined decision metrics is greater than or equal to the threshold, the system determines that it is an appropriate time to conduct the intervention and the intervention is performed/implemented at step 910.

Two examples of methods 1100 (FIG. 11) and 1200 (FIG. 12) of determining an appropriate time to conduct an intervention will now be described. The methods 1100, 1200 are specific examples that may be used instead of the general method 900 described above. The first example method 1100 uses a duration of the visual activity to determine an appropriate time to conduct an intervention. The second example method 1200 uses vehicle motion to determine an appropriate time to conduct an intervention.

Figure 11:
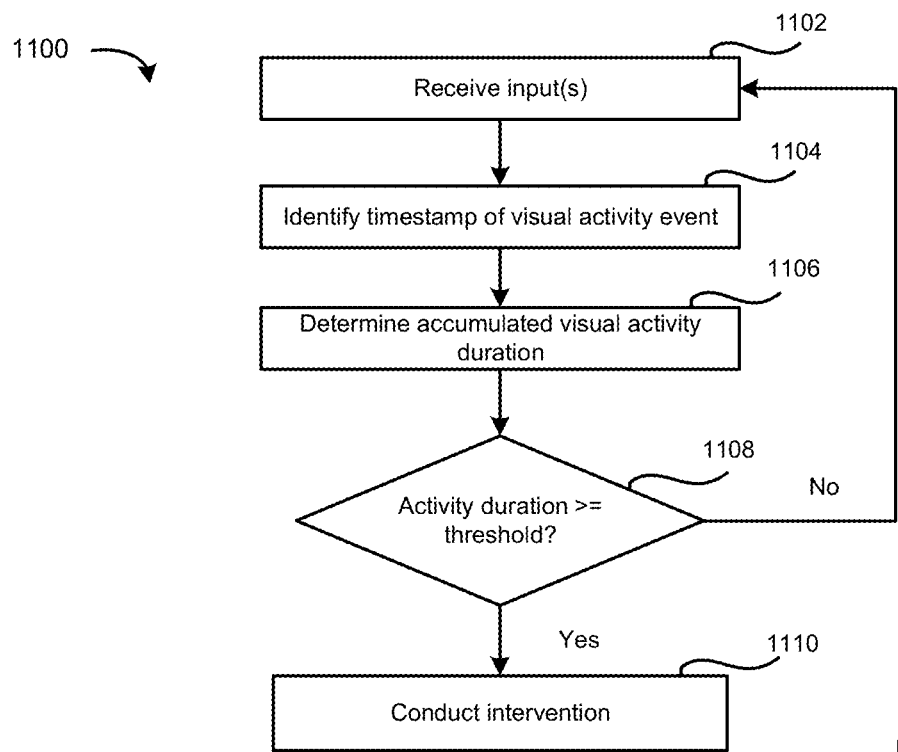
FIG. 11 is a flowchart of a method of determining a time to conduct an intervention based on a duration of the visual activity in accordance with an embodiment of the present disclosure.

Referring now to FIG. 11, a method of determining an appropriate time to conduct an intervention based on a duration of the visual activity in accordance with an embodiment of the present disclosure will be described. In step 1102, the system receives one or more data inputs comprising event information and a timestamp. At step 1104, the system identifies the timestamp(s) of visual activities or events (such as reading events) from the one or more data inputs based on the event information so that an accumulated visual activity duration (e.g., reading event time) can be determined. The event information identifies an input, input type, input source, or event type that has been detected. The event information may be provided by an input/output (I/O) port of the input device or sensor (such as the touchscreen 338, stylus, mouse, button, an eye tracker 348 or camera 350 of the portable electronic device 300) or information provided by the operating system 330 of the portable electronic device 300. As noted above, the information provided by the operating system 330 may include a display state of the touchscreen 338 of the portable electronic device 300 (e.g., screen on or off due to activity timeout or the like), the content being displayed on the touchscreen 338 of the portable electronic device 300, the current activity, and/or an active application of the portable electronic device 300. The information may be derived by the operating system or other software module by inputs from the input devices of the portable electronic device 300, an eye tracker 348 or camera 350 of the portable electronic device 300, or in-vehicle eye tracker 116 or in-vehicle camera 112.

In step 1106, the system determines the accumulated visual activity duration (e.g., reading event time). In step 1108, the system determines whether the accumulated visual activity duration equals or is greater than a threshold indicating a high risk of inducing motion sickness should the user continue the visual activity. An example of a visual activity duration is 10 minutes. The visual activity duration may be based on setting or preferences of a user profile and/or settings of the motion sickness prevention mode. Alternatively, the visual activity duration may be dynamically determined based on one or more of the following parameters: (1) past and/or present visual activity characteristics such as a the nature of the visual activity or duration; (2) past and/or planned/pending vehicle motions such as longitudinal acceleration, lateral acceleration, shaking of the vehicle body, speed, etc.; (3) past and/or planned/pending route information such as curves/turns, road type, road conditions, speed limit, traffic condition, geographic environment, altitude, etc.; and (4) risk factors associated with the user and/or visual activity content such as passenger's age, gender, sleep history, illness history, motion sickness history, food/drink intake before the ride, current fatigue level, the current content on the device (e.g. text, videos, games etc.).

At step 1110, in response to a determination that the accumulated visual activity duration equals or is greater than the threshold, the system determines that it is an appropriate time to conduct the intervention. Else, the system continues to monitor the accumulated visual activity duration.

Figure 12:
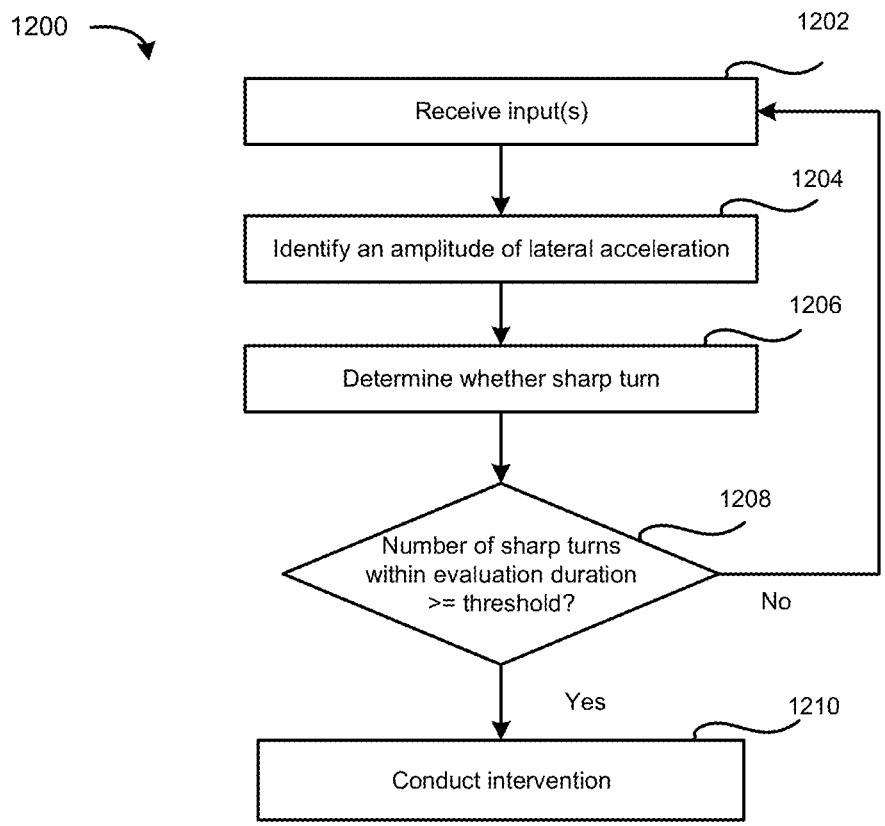
FIG. 12 is a flowchart of a method of determining a time for an intervention based on vehicle motion in accordance with an embodiment of the present disclosure.

Referring now to FIG. 12, a method of determining an appropriate time for an intervention based on vehicle motion in accordance with an embodiment of the present disclosure will be described. In step 1202, the system receives one or more data inputs comprising vehicle motion data, each associated with a timestamp. In step 1204, the system determines an amplitude of lateral acceleration based on the vehicle motion data. In step 1206, the system determines whether the amplitude of lateral acceleration equals or is greater than a lateral acceleration threshold indicating a high risk of inducing motion sickness should the user continue the visual activity, for example, whether the amplitude of lateral acceleration is considered a "sharp turn". An example of a lateral acceleration indicating a sharp turn is 3.92 m/s$^2$. The lateral acceleration threshold may be based on setting or preferences of a user profile and/or settings of the motion sickness prevention mode. Alternatively, the lateral acceleration threshold may be dynamically determined based on or more of the following parameters: (1) past and/or present visual activity characteristics such as a the nature of the visual activity or duration; (2) past and/or planned/pending vehicle motions such as longitudinal acceleration, lateral acceleration, shaking of the vehicle body, speed, etc.; (3) past and/or planned/pending route information such as curves/turns, road type, road conditions, speed limit, traffic condition, geographic environment, altitude, etc.; and (4) risk factors associated with the user and/or visual activity content such as passenger's age, gender, sleep history, illness history, motion sickness history, food/drink intake before the ride, current fatigue level, the current content on the device (e.g. text, videos, games etc.).

In step 1208, the system determines whether the number of sharp turns within an evaluation duration equals or is greater than a threshold indicating a high risk of inducing motion sickness should the user continue the visual activity. An example of an evaluation duration is 10 minutes and an example of the number of sharp turns is 4 times. The evaluation duration and the number of sharp turns may be based on setting or preferences of a user profile and/or settings of the motion sickness prevention mode. Alternatively, the lateral acceleration threshold may be dynamically determined based on one or more of the parameters noted above. It will be appreciated that both the lateral acceleration and the evaluation duration are tunable parameters.

At step 1210, in response to a determination that the number of sharp turns within the evaluation duration equals or is greater than the set threshold, the system determines that it is an appropriate time to conduct the intervention. Else, the system continues to monitor the vehicle motion.

It will be appreciated that more than one decision metric may be considered, for example multiple parameters may be considered such as an accumulated visual activity duration and a motion data threshold such as the number of sharp turns, with the visual activity duration being the evaluation duration. It will be appreciated that that the criteria for conducting an intervention (e.g., threshold indicating a high risk of inducing motion sickness) can be adaptive depending on other situations. For example, the decision can be made based on a combination of visual activity duration and the number of sharp turns. For example, the threshold for visual activity duration may vary depending on the frequency of sharp turns. If there are more sharp turns in a short period of time (relative to a default number, e.g., 4 sharp turns), then the threshold of visual activity duration can be decreased from a default duration (e.g., 10 minutes). In contrast, if there are less or no sharp turns the threshold for the visual activity duration can be increased from the default duration.

Returning to FIG. 6 and the method 600, at step 612, a type of intervention may optionally be determined by the user or system. Alternatively, the type of intervention may be predetermined and stored as a part of a user profile and/or settings of the motion sickness prevention mode.

Figure 13:
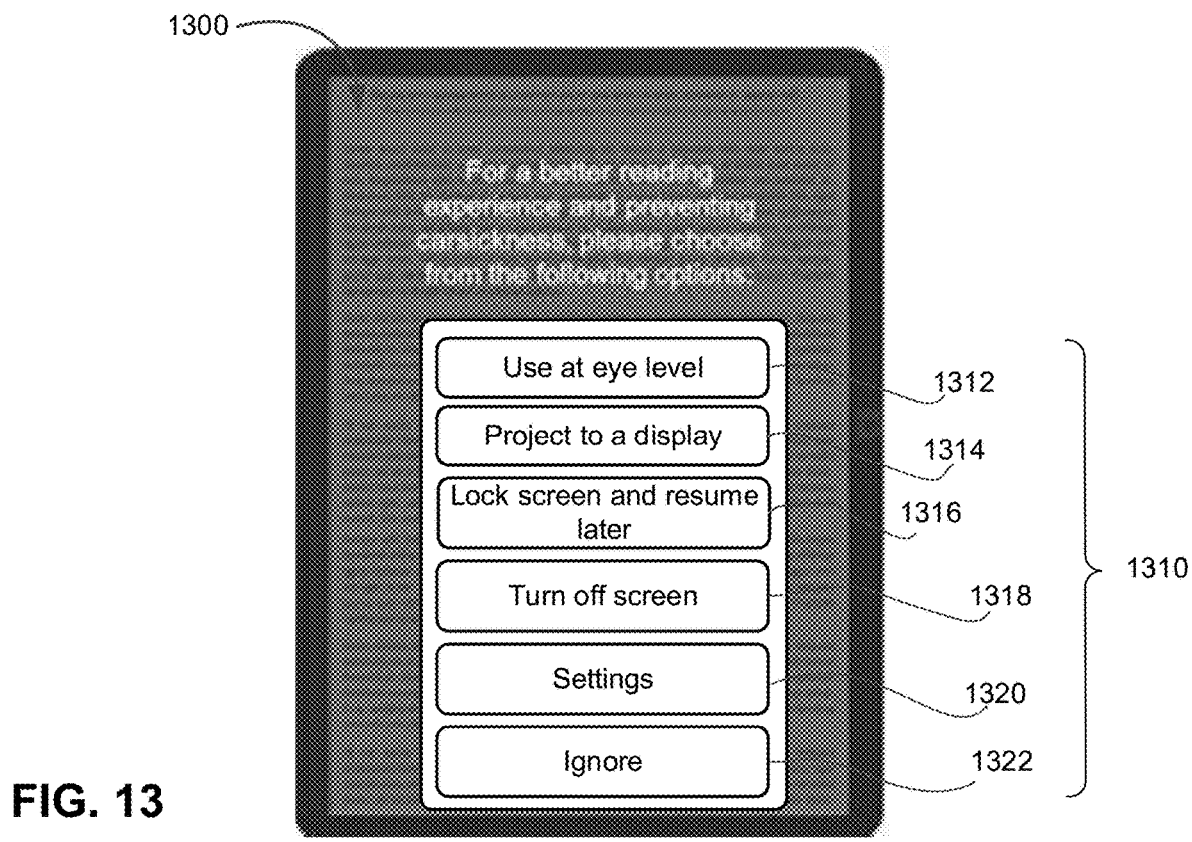
FIG. 13 is an example of a visual user interface screen comprising a prompt to select an intervention option in accordance with one embodiment of the present disclosure.

In examples in which the type of intervention is determined by the user, a prompt of available intervention option(s) is displayed on the touchscreen 338 for user selection of the intervention type. When the system decides to conduct the intervention, it interrupts the current workflow of the visual activity on the portable electronic device 300 and display the prompt. In some examples, the prompt does not disappear until a selection of the intervention type is received. FIG. 13 is an example of a VUI screen 1300 comprising a prompt to select an intervention option. The VUI screen 1300 is an overlay provided over the visual activity screen content displayed on the touchscreen 338 which, in the shown example, relates to a reading activity. The VUI screen 1300 includes a prompt message that includes an instruction the user to select an intervention option and a plurality of selectable onscreen buttons 1310. The onscreen buttons 1310 may be selected via corresponding input via the touchscreen 338, i.e. touching an area of the touchscreen 338 corresponding to the onscreen buttons 1310 or other suitable input. The onscreen buttons 1310 may be depending on the available features of the vehicle 105, for example, the available of an in-vehicle display. If a feature such as an in-vehicle display is not available, the corresponding onscreen buttons 1310 may not be shown or is shown but is not selectable (e.g., the corresponding onscreen buttons 1310 may be greyed out).

The selectable onscreen buttons 1310 include a plurality of intervention options comprising a "Use at eye level" button 1312 in which the user intends to change their posture and use (e.g., read) the portable electronic device 300 at eye level and which triggers a corresponding intervention workflow (described below) and a "Project to a display" button 1314 in which the display content of the portable electronic device 300 is projected to an in-vehicle display such as a display 136 located in the back of a headrest for use by rear seat passenger(s) or a vehicle dashboard for use by the front seat passenger. The selectable onscreen buttons 1310 may also include a "Lock screen and resume later" button 1316 for locking the touchscreen 338 and pausing or suspending the visual activity and/or a "Turn off screen" button 1318 for turning off the touchscreen 338. The selectable onscreen buttons 1310 may also include a "Settings" button 1320 for invoking a menu/options VUI screen for configuring the settings of the motion sickness prevention mode. The Settings menu/options allows various settings to be set or changed including an accumulated visual activity duration for triggering an intervention, vehicle motion thresholds for triggering an intervention, intervention type (e.g., "Use at eye level", "Protect to a display", "Lock screen and resume later", and "Lock screen and resume later", etc.), and intervention options (e.g., in-vehicle display). The selectable onscreen buttons 1310 may also include an "Ignore" button 1322 for ignoring the prompt and dismissing the prompt and returning to the visual activity without intervention.

Figure 19C:
FIGS. 19A-C represent example visual user interface screens of different intervention implementations in accordance with one embodiment of the present disclosure.
Figure 19B:
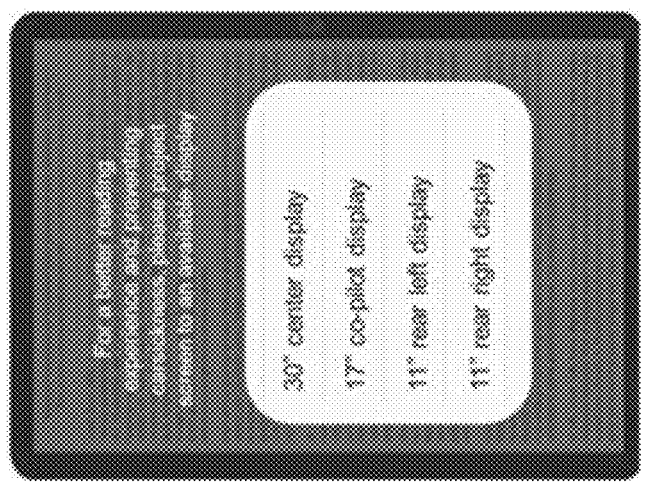
Figure 19A:
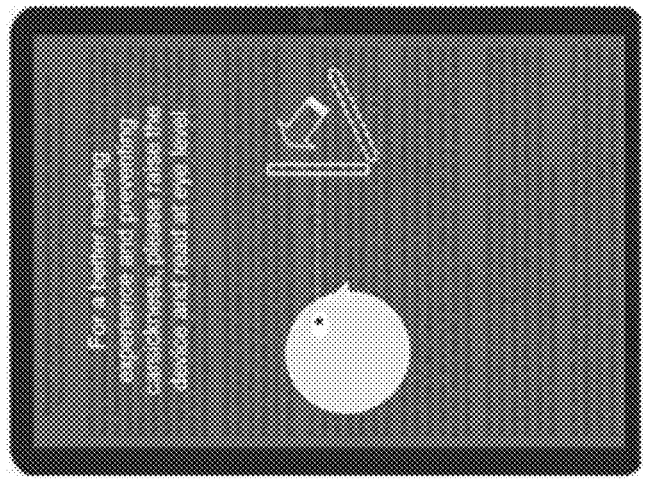

In examples in which the type of intervention is determined by the system, instead of providing multiple options for user to choose, the system intelligently determines and implement an appropriate intervention. For example, if there is no in-vehicle display available, the system may directly implement the "use at eye level" intervention and prompts to instruct user to use the portable electronic device 300 at eye level without showing the prompt to select an intervention option described above. This is shown in the VUI screen of FIG. 19A. When in-vehicle displays are available, the system may display a list of the available in-vehicle displays without displaying the prompt to select an intervention option as shown in the VUI screen of FIG. 19B. Alternatively, the in-vehicle display may be predetermined by a connection between the portable electronic device 300 and the vehicle control system 115 (e.g., a connection path/ID) and/or a location of the user/portable electronic device 300. The location of the user/portable electronic device 300 may be determined by an in-vehicle camera 112 and computer vision, among other possibilities. For example, the in-vehicle communication subsystem of the vehicle control system 115 may associate each passenger seat/position with an in-vehicle display, and each connection path/ID between a respective portable electronic device 300 and the vehicle control system 115 may be associated with a respective passenger seat/position. In response to predetermined decision criteria, such as when past and/or planned motion is determined to be likely to cause severe motion sickness, the system may automatically turn off the touchscreen 338 of the portable electronic device 300 or the in-vehicle display, depending on the active display at the relevant time. A notification may be displayed on the VUI screen notifying the user that the display will be automatically turned off. The notification may include a countdown timer regarding when the display will be turned off as shown in FIG. 19C.

Figure 14:
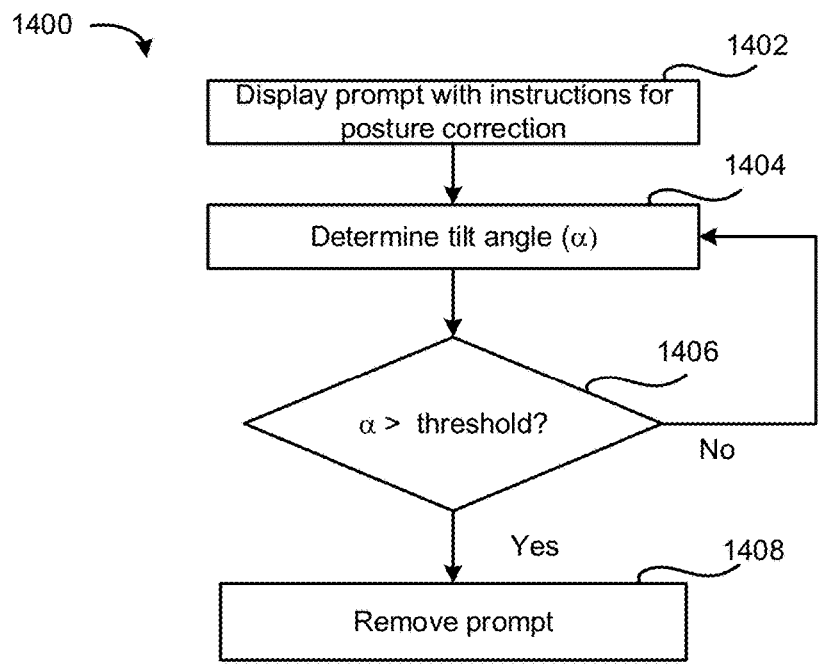
FIG. 14 is a flowchart of a method of implementing a posture-based intervention in accordance with an embodiment of the present disclosure.

Returning to FIG. 6 and the method 600, at step 614, the selected or predetermined intervention is implemented or performed. FIG. 14 is a flowchart of a method 1400 of implementing a posture-based intervention in accordance with an embodiment of the present disclosure. Step 614 and the method 1400 are performed by the intervention implementation module 179/379. The posture-based intervention may be selected by the user via selection of the "Use at eye level" button 1312 of the VUI screen 1300. The posture-based intervention instructs the passenger to correct their posture and use the device at eye level and monitors the user's posture to ensure that the device is so used.

Referring to FIG. 14, at step 1402 the portable electronic device 300 displays a prompt comprising instructions to move the device to eye level is displayed on the touchscreen 338. The step of displaying the prompt comprises generating a VUI screen with the prompt and displaying the VUI screen. The VUI screen typically comprises the previous VUI screen with the prompt overlayed to block the visual activity content. Alternatively, a different VUI screen with the prompt but without the visual activity content may be used. The prompt blocks the visual activity content so that the user cannot continue with the visual activity. The instructions may comprise an animation, video and/or a series of static images and/or text to instruct the user to lifting up the device to an upright position so that he/she can read at eye level. At step 1404, the portable electronic device 300 determines and monitors the tilt angle (α) of the portable electronic device 300, for example, via the IMU sensor 346 in the portable electronic device 300. At step 1406, the portable electronic device 300 determines whether the tilt angle exceeds the threshold tilt angle (e.g., 75 degrees). In response to a determination that tilt angle exceeds the threshold tilt angle, the prompt which blocks the visual activity content is removed so that the user can continue with the visual activity at step 1408. Else, the prompt remains. The step of removing the prompt comprises generating the VUI screen without the prompt and displaying the new VUI screen.

Figure 15A:
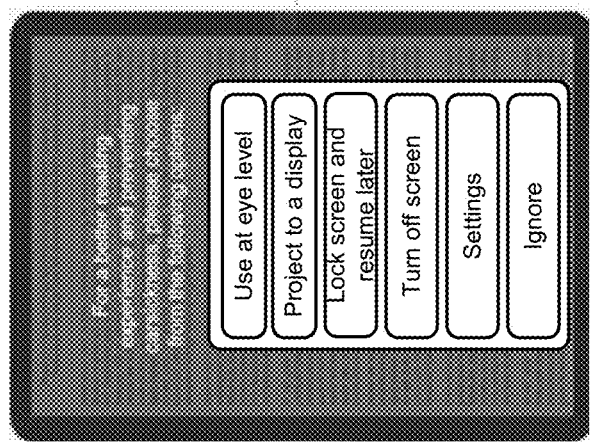
FIGS. 15A-C represent an example of a series of visual user interface screens for implementing the posture-based intervention of FIG. 14 in accordance with one embodiment of the present disclosure.
Figure 15B:
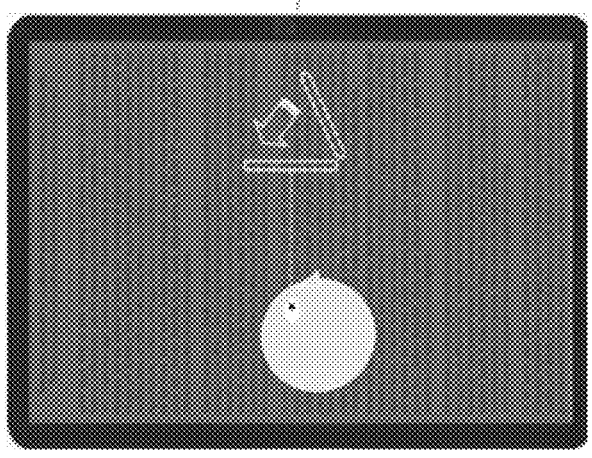
Figure 15C:

FIGS. 15A-15C represent an example series of VUI screens for implementing the posture-based intervention of FIG. 14. In FIG. 15A, the prompt to select an intervention option is displayed on the touchscreen 338. In response to the selection of the "Use at eye level" button 1312 of the prompt, the prompt comprising instructions to move the device to eye level is displayed on the touchscreen 338 as shown in FIG. 15B. In response to a determination that tilt angle exceeds the threshold tilt angle, the prompt comprising instructions to move the device to eye level is removed so that the user can continue with the visual activity as shown in FIG. 15C. An onscreen indicator, such as a special symbol, may be displayed on the touchscreen 338 to differentiate the current "anti-motion sickness" mode from the "normal use" mode. For example, the symbol "A" may be displayed proximate or near the right bottom of the touchscreen 338 as an indication of the portable electronic device 300 is now in the "anti-motion sickness" mode as shown in FIG. 15C. Selecting the onscreen indicator (e.g., the symbol "A") may be used to disable the "anti-motion sickness" mode, for example by touching an area of the touchscreen 338 corresponding to the onscreen indicator or other suitable input.

Although the foregoing description describes embodiments using a UI-based prompt for adjusting a user's posture in which the visual activity content is blocked by a prompt causing the user to correct their posture before the visual activity content is unblocked, in other embodiments the visual activity content itself may be moved, for example moved in upwards in terms of its relative position on the touchscreen 338, so that the user follows the moving content and corrects posture.

Figure 16:
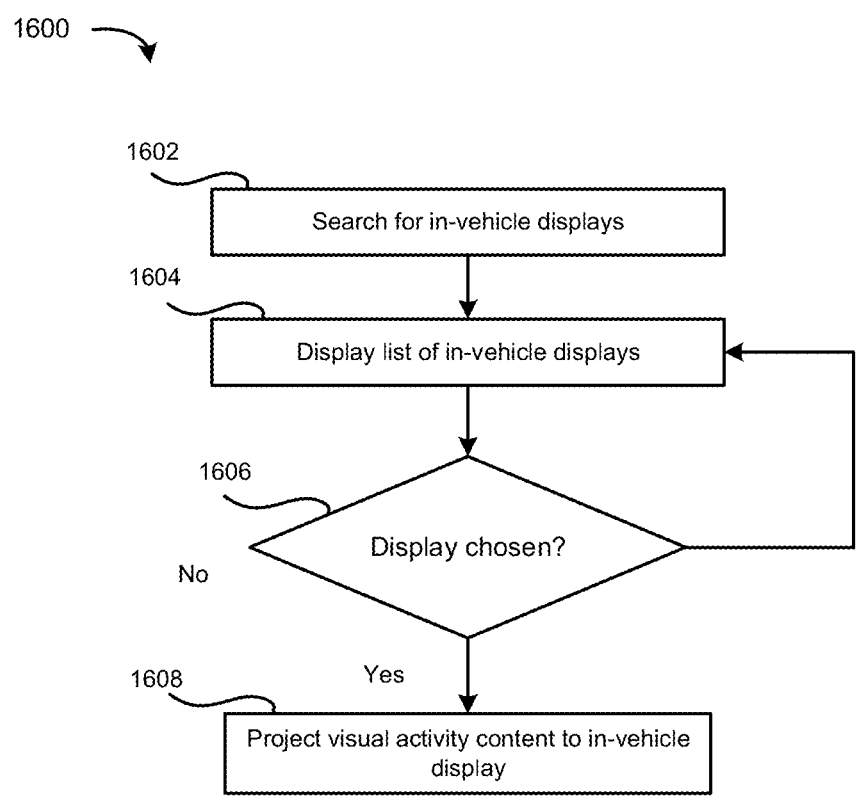
FIG. 16 is a flowchart of a method of implementing a multi-display intervention in accordance with one embodiment of the present disclosure.

FIG. 16 is a flowchart of a method 1600 of implementing a multi-display intervention in accordance with one embodiment of the present disclosure. Step 614 and the method 1500 are performed by the intervention implementation module 179/379. The multi-display intervention may be selected by the user via selection of the "Project to a display" button 1314 of the VUI screen 1300. The multi-display intervention instructs the portable electronic device 300 to project, cast or output the display content of the portable electronic device 300 to an in-vehicle display such as a display 136 located in the back of a headrest for use by rear seat passenger(s) or a vehicle dashboard for use by the front seat passenger instead of the touchscreen 338 of the portable electronic device 300.

At step 1602, the system optionally searches for in-vehicle displays via Bluetooth or other wired or wireless connection. This step is optional and may only be performed if the portable electronic device 300 does not already have a wired or wireless connection to the vehicle control system 115 and/or a search for available in-vehicle display has not been previously performed or a list of available in-vehicle displays has not been provided by the vehicle control system 115. In some examples, the "Project to a display" button 1314 of the VUI screen 1300 may not be available if the portable electronic device 300 does not already have a wired or wireless connection to the vehicle control system 115 and the vehicle control system 115 is determined not have an in-vehicle display.

At step 1604, the system optionally displays a list of available in-vehicle displays on the touchscreen 338 of the portable electronic device 300. This step is optional and may only be performed if more than one in-vehicle display is available, an in-vehicle display has not been previously determined, and/or an appropriate in-vehicle display cannot be automatically determined by the location of the portable electronic device 300, which may be determined by the connection between the portable electronic device 300 and the vehicle control system 115 (e.g., a connection path/ID) and/or the location of the user/portable electronic device 300. For example, the in-vehicle communication subsystem of the vehicle control system 115 may associate each passenger seat/position with an in-vehicle display, and each connection path/ID between a respective portable electronic device 300 and the vehicle control system 115 may be associated with a respective passenger seat/position. The step of displaying the list of available in-vehicle displays comprises generating a VUI screen with the list of available in-vehicle displays and displaying the VUI screen. The VUI screen typically comprises the previous VUI screen with the list of available in-vehicle displays overlayed to block the visual activity content. Alternatively, a different VUI screen with the list of available in-vehicle displays but without the visual activity content may be used. At step 1606, the system optionally waits for a selection of an in-vehicle display if more than one in-vehicle display is available.

At step 1606, in response to input selecting an in-vehicle display from a list of available in-vehicle displays displayed on the touchscreen 338 of the portable electronic device 300 or if only one in-vehicle display is available, the system projects the display visual activity content to the in-vehicle display and optionally turns off the touchscreen 338 of the portable electronic device 300.

FIGS. 17A-C represent an example of a series of visual user interface screens for implementing the multi-display intervention of FIG. 16. In FIG. 17A, the prompt to select an intervention option is displayed on the touchscreen 338. In response to the selection of the "Project to a display" button 1314 of the prompt, a list of available in-vehicle displays is displayed on the touchscreen 338 as shown in FIG. 17B. For each of the available in-vehicle display, a corresponding on-screen button is provided. In the example of FIG. 17B, an onscreen button 1702 is provided for a 30" centre display, an onscreen button 1704 is provided for a 17" co-pilot display, an onscreen button 1706 is provided for a 11" rear left display, an onscreen button 1708 is provided for a 11" rear right display. In response to input selecting an in-vehicle display in the list of available in-vehicle displays, for example by touching an area of the touchscreen 338 corresponding to the onscreen button 708 for a 11" rear right display, or other suitable input, the portable electronic device 300 outputs the visual activity content to the selected in-vehicle display and optionally turns of the touchscreen 338 of the portable electronic device 300 as shown in FIG. 17C. As noted above, an onscreen indicator (e.g., symbol "A") be displayed on the touchscreen 338 to differentiate the current "anti-motion sickness" mode from the "normal use" mode and optionally disable the "anti-motion sickness" mode, for example by touching an area of the touchscreen 338 corresponding to the onscreen indicator or other suitable input, may be provided.

FIGS. 18A-C represent an example of a series of visual user interface screens for terminating an intervention, whether a posture-based intervention as in the method of FIG. 14 or based on a multi-display intervention as in the method of FIG. 16. For either intervention type, the intervention may be terminated by the user after being implemented or performed. For example, whenever the user is using their portable electronic device 300 at the eye level or on an in-vehicle display, a menu/option VUI may be invoked or activated by selecting the symbol "A" at the bottom right of the VUI screen which indicating the anti-motion sickness mode, for example by touching an area of the touchscreen 338 or in-vehicle display in corresponding to the symbol "A", or other suitable input. As shown in FIG. 18A, the prompt to select an intervention option is displayed on the touchscreen 338. In response to the selection of the symbol "A", a menu/option VUI comprising a prompt is displayed which asks whether the user would like to quit (or exit or end) the anti-motion sickness mode. The step of displaying the menu/option VUI comprises generating a VUI screen with the prompt and displaying the VUI screen. In the example of FIG. 18B, the prompt comprises an onscreen button 1802 is provided for "Yes" to quit the anti-motion sickness mode, an onscreen button 1804 for "No" to continue (or maintain) the anti-motion sickness mode, and a button 1806 for "Settings" for invoking or activating a settings menu/option VUI for configuring the settings of the anti-motion sickness mode. In response to input selecting "Yes" to quit the anti-motion sickness mode, the prompt is removed and the portable electronic device 300 is returned to the normal use mode. The step of removing the prompt comprises generating the VUI screen without the prompt and displaying the new VUI screen. When the intervention was a multi-display intervention, this comprises turning on the touchscreen 338 of the portable electronic device 300 and outputting the visual activity content to the touchscreen 338 as shown in FIG. 18C.

Figure 10:
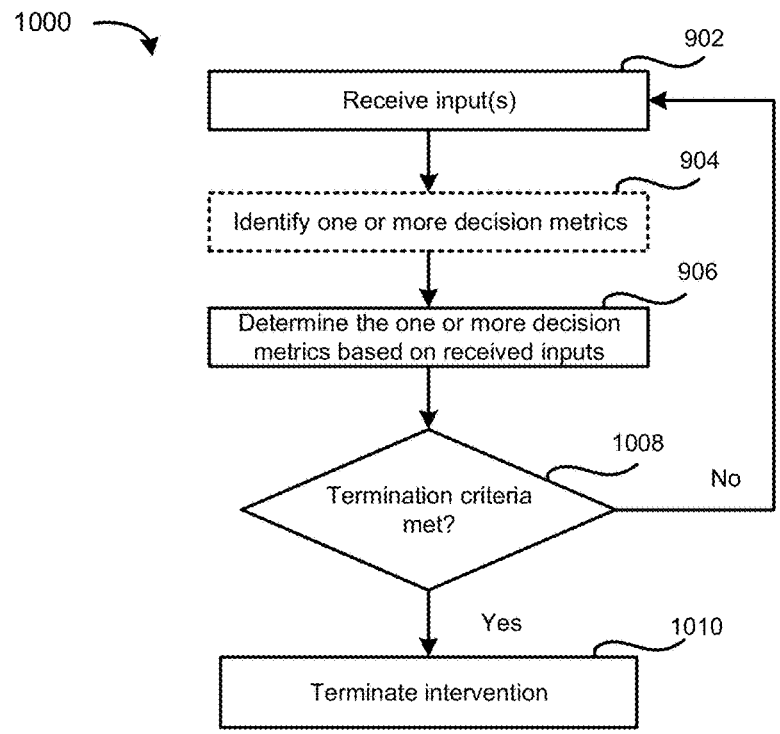
FIG. 10 is a flowchart of a general method of determining a time to terminate an intervention in accordance with an embodiment of the present disclosure.

For any type of intervention, including "Use at eye level" and "Project to a display" interventions, the interventions may be terminated intelligently by the system after being implemented/performed. For example, when the vehicle motion remains stable for a threshold period of time, the vehicle has stopped or is no longer in the driving mode, the system may determine that the intervention can be terminated. The system may prompt the user for input to terminate the intervention by displaying a suitable menu/option VUI such as that shown in FIG. 18B, or the intervention may be terminated automatically without a prompt. In response to automatic action or input selecting "Yes" to quit the anti-motion sickness mode, the portable electronic device 300 is returned to the normal use mode. The step of removing the prompt comprises generating the VUI screen without the prompt and displaying the new VUI screen. FIG. 10 is a flowchart of a general method of determining an appropriate time to terminate an intervention in accordance with an embodiment of the present disclosure. The method 1000 is similar to the method 900 for of determining an appropriate time to conduct an intervention except different criteria are used in the decision making. At step 1008, it is determined whether termination criteria are met. In at least some examples, determining whether termination criteria are met comprises determining whether all of the determined decision metrics are less than a respective threshold indicating a high risk of motion sickness if the user continues to use their portable electronic device 300 for visual activities. This step is performed by the intervention decision and monitoring module 177/377. Alternatively, a second threshold indicating a low risk of motion sickness may be used instead of the first threshold indicating a high risk of motion sickness. The second threshold indicating a low risk of motion sickness is lower than the first threshold indicating a high risk of motion sickness used to determine whether to perform an intervention. If all of the determined decision metrics are less than the second threshold indicating a low risk of motion sickness, the system determines that the intervention can be terminated at step 1010.

Advantageous Effects of the Technical Solution of Embodiments of the Present Disclosure The postural analysis used to identify a user's posture in accordance with the method and system of the present disclosure can be implemented on any handheld portable electronic device with a built-in motion sensor (e.g., IMU), and can be applied to multiple scenarios including using a portable electronic device for visual activities in vehicles with or without in-vehicle displays equipped, including cars, buses and other forms of public transit.

The use of posture-based intervention to keep a healthy posture while using a portable electronic device for visual activities in accordance with the method and system of the present disclosure is based on proven strategies to prevent motion sickness and can be implemented to any handheld portable electronic device with a built-in motion sensor (e.g., IMU). No extra devices or hardware are needed to implement and method and system of the present disclosure, although in-vehicle sensors may be used in place of a built-in motion sensor of the portable electronic devices if desired. The method and system of the present disclosure can optionally take advantage of multi-screen interaction between the handheld portable electronic device and in-vehicle display to promote a healthy posture, making a good use of available in-vehicle displays.

The teachings of the present disclosure are not limited to preventing motion sickness and can be used for other posture correcting reasons such as neck pain caused when users tilt their head to look at portable electronic devices for long durations. In this use case, the method and system of the present disclosure may not need to take into consideration whether the user is in a moving vehicle nor the vehicle dynamics. Lastly, the system may be embodied in other situations other than vehicles. For example, the method and system of the present disclosure can distribute and project the display contents of the portable electronic device to large screens (e.g., TVs) in the home or head-worn-display when user is using their portable electronic device for visual activities outside of the vehicle, with motion (e.g., while walking) or without.

General

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified, as appropriate.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer-implemented method of preventing motion sickness while using a portable electronic device, comprising:
   determining whether criteria for performing an intervention have been met, wherein the criteria for performing the intervention comprise a determination that the portable electronic device is in motion, that the portable electronic device is being used for visual activities, and that the user of the portable electronic device has an unhealthy posture; and
   in response to a determination that the criteria for performing an intervention have been met:
      determining whether any of one or more decision metrics are greater than or equal to a respective threshold, wherein the respective threshold of each decision metric indicates a high risk of motion sickness if the user were to continue to use the portable electronic device for visual activities, wherein the decision metrics comprise an accumulated visual activity duration; and
      performing the intervention in response to a determination that any of the decision metrics is greater than or equal to the respective threshold.

2. The method of claim 1, wherein the determination that user of the portable electronic device has an unhealthy posture is based on a tilt angle of the portable electronic device, a tilt angle of a head of the user of the portable electronic device or an eye gaze direction of the user of the portable electronic device.

3. The method of claim 1, wherein the unhealthy posture is a looking-downwards posture.

4. The method of claim 1, further comprising determining whether the user of the portable electronic device has an unhealthy posture by:
   determining, by one or more sensors, a tilt angle of the portable electronic device, a tilt angle of a head of the user or an eye gaze direction of the user of the portable electronic device;
   determining whether the tilt angle of the portable electronic device, the tilt angle of the head of the user or the eye gaze direction of the user of the portable electronic device is within a predetermined range representing a looking-downwards posture;
   determining that the user of the portable electronic device has an unhealthy posture in response to a determination that the tilt angle of the portable electronic device, the tilt angle of the head of the user or the eye gaze direction of the user of the portable electronic device is within the predetermined range; and
   determining that the user of the portable electronic device has a healthy posture in response to a determination that the tilt angle of the portable electronic device, the tilt angle of the head of the user or the eye gaze direction of the user of the portable electronic device is not within the predetermined range.

5. The method of claim 4, wherein the tilt angle of the portable electronic device, the tilt angle of the head of the user or the eye gaze direction of the user of the portable electronic device is relative to a horizontal reference, and wherein the predetermined range is 0 degrees to 75 degrees.

6. The method of claim 4, wherein the tilt angle of the portable electronic device, the tilt angle of the head of the user or the eye gaze direction of the user of the portable electronic device is relative to a vertical reference, and wherein the predetermined range is 15 degrees to 90 degrees.

7. The method of claim 1, wherein one or more of the decision metrics are based on one or more of the following parameters:
   (1) past and/or present visual activity characteristics;
   (2) past and/or planned vehicle motions;
   (3) past and/or planned route information; or
   (4) risk factors associated with the user and/or visual activity content.

8. The method of claim 1, wherein the decision metrics further comprise a motion data threshold.

9. The method of claim 8, wherein the motion data threshold comprises a lateral acceleration amplitude threshold.

10. The method of claim 8, wherein the motion data threshold comprises a number of sharp turns.

11. The method of claim 1, further comprising:
    determining whether all of the decision metrics are less than the respective threshold; and
    terminating the intervention in response to a determination that all of the decision metrics are less than the respective threshold.

12. The method of claim 1, wherein the intervention comprises:
    displaying a prompt on a display of the portable electronic device, the prompt including an instruction to move the portable electronic device to eye level;
    monitoring a tilt angle of the portable electronic device, a tilt angle of the head of the user or an eye gaze direction of the user of the portable electronic device; and
    removing the prompt in response to a determination that the tilt angle of the portable electronic device, the tilt angle of the head of the user or the eye gaze direction of the user of the portable electronic device is not within a predetermined range representing a looking-downwards posture.

13. The method of claim 12, wherein the tilt angle of the portable electronic device, the tilt angle of the head of the user or the eye gaze direction of the user of the portable electronic device is relative to a horizontal reference, and wherein the predetermined range is 0 degrees to 75 degrees, or
    wherein the tilt angle of the portable electronic device, the tilt angle of the head of the user or the eye gaze direction of the user of the portable electronic device is relative to a vertical reference, and wherein the predetermined range is 15 degrees to 90 degrees.

14. The method of claim 1, further comprising:
    displaying a prompt to select an intervention type on a display of the portable electronic device, the prompt including a plurality of selectable onscreen button, one selectable onscreen button for each of available intervention type;
    wherein the intervention is performed in response to selection of a button in the plurality selectable onscreen buttons, wherein the performed intervention corresponds to the selected button.

15. The method of claim 14, wherein the available intervention types comprise "Use at eye level", "Project to a display", "Lock screen and resume later" and "Turn off screen" intervention types.

16. The method of claim 1, wherein the intervention comprises:
moving visual activity content on a display of the portable electronic device in terms of its relative position on the display of the portable electronic device.

17. The method of claim 1, wherein the intervention comprises outputting visual activity content associated with the visual activity to an auxiliary display.

18. The method of claim 17, wherein the auxiliary display is an in-vehicle display.

19. A computing device, comprising:
sensors;
a processor system coupled to the sensors;
wherein the processor system is configured to:
  determine whether criteria for performing an intervention have been met, wherein the criteria for performing the intervention comprise a determination that the portable electronic device is in motion, that the portable electronic device is being used for visual activities, and that the user of the portable electronic device has an unhealthy posture; and
  in response to a determination that the criteria for performing an intervention have been met:
    determine whether any of one or more decision metrics are greater than or equal to a respective threshold, wherein the respective threshold of each decision metric indicates a high risk of motion sickness if the user were to continue to use the portable electronic device for visual activities, wherein the decision metrics comprise an accumulated visual activity duration; and
    perform the intervention in response to a determination that any of the decision metrics is greater than or equal to the respective threshold.

20. A computer-implemented method of preventing motion sickness while using a portable electronic device, comprising:
determining whether criteria for performing an intervention have been met, wherein the criteria for performing the intervention comprise a determination that the portable electronic device is in motion, that the portable electronic device is being used for visual activities, and that the user of the portable electronic device has an unhealthy posture; and
in response to a determination that the criteria for performing an intervention have been met:
  displaying a prompt to select an intervention type on a display of the portable electronic device, the prompt including a plurality of selectable onscreen button, one selectable onscreen button for each of available intervention type; and
  performing a selected intervention in response to selection of a button in the plurality selectable onscreen buttons, wherein the selected intervention corresponds to the button selection.

\* \* \* \* \*